(12) United States Patent
Murakami et al.

(10) Patent No.: US 8,681,715 B2
(45) Date of Patent: Mar. 25, 2014

(54) RADIO COMMUNICATION METHOD AND RADIO COMMUNICATION DEVICE

(75) Inventors: Yutaka Murakami, Osaka (JP); Naoya Yosoku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/523,497

(22) PCT Filed: Jan. 18, 2008

(86) PCT No.: PCT/JP2008/050647
§ 371 (c)(1),
(2), (4) Date: Jul. 16, 2009

(87) PCT Pub. No.: WO2008/088054
PCT Pub. Date: Jul. 24, 2008

(65) Prior Publication Data
US 2010/0103919 A1    Apr. 29, 2010

(30) Foreign Application Priority Data

Jan. 18, 2007 (JP) ................................. 2007-009649
Jan. 18, 2008 (JP) ................................. 2008-009528

(51) Int. Cl.
*H04W 4/00* (2009.01)
*H04W 72/00* (2009.01)

(52) U.S. Cl.
USPC ............................ 370/329; 370/328; 455/450

(58) Field of Classification Search
USPC ........................................................ 370/329
See application file for complete search history.

(56) References Cited

U.S. PATENT DOCUMENTS

| 2005/0105632 A1* | 5/2005 | Catreux-Erces et al. ..... 375/267 |
| 2005/0111590 A1* | 5/2005 | Fang et al. .................... 375/330 |
| 2006/0063543 A1* | 3/2006 | Matoba et al. ................ 455/509 |

FOREIGN PATENT DOCUMENTS

| JP | 2003/20317 | 1/2003 |
| JP | 2003-203178 | 7/2003 |
| WO | 2006/007292 | 1/2006 |

OTHER PUBLICATIONS

3GPP TSG-RAN WG1 Meeting #44,"Channel-Dependent Scheduling for E-UTRA Uplink," NTT DoCoMo, Fujitsu, NEC, Panasonic, Sharp, R1-060323, Feb. 2006, pp. 1-11.
T. Nakagawa et al. "Investigation on optimum roll-off factor of a spectrum shaping filter for single-carrier FDMA radio access in evolved UTRA uplink," IEICE, RCS2005-148, Jan. 2006, pp. 143-149, with English Abstract.
"Digital Wireless Trasmmission Technology," Pearson Education, Seiichi Sanpei, Sep. 2002, pp. 282-293, with English Translation.
International Search Report dated Apr. 22, 2008 w/ English translation.
Chinese Office Action dated Oct. 20, 2011.

* cited by examiner

*Primary Examiner* — Shripal Khajuria
(74) *Attorney, Agent, or Firm* — Dickinson Wright PLLC

(57) ABSTRACT

When the SC-FDMA method is used in combination with the multi-antenna transmission technique, a radio transmission method effectively improves the frequency use efficiency by performing appropriate frequency allocation to a plurality of antennas while suppressing degradation of the reception quality caused by interference. In the radio transmission method of the SC-FDMA type, according to the number of terminals simultaneously accessing a base station within a usable frequency band, it is possible to allocate all the transmission signals (transmission stream) to be transmitted by different antennas to different frequency bands or to use the MIMO transmission in combination. Moreover, according to the number of terminals making an access, the number of terminals which perform the MIMO transmission can be varied.

3 Claims, 29 Drawing Sheets

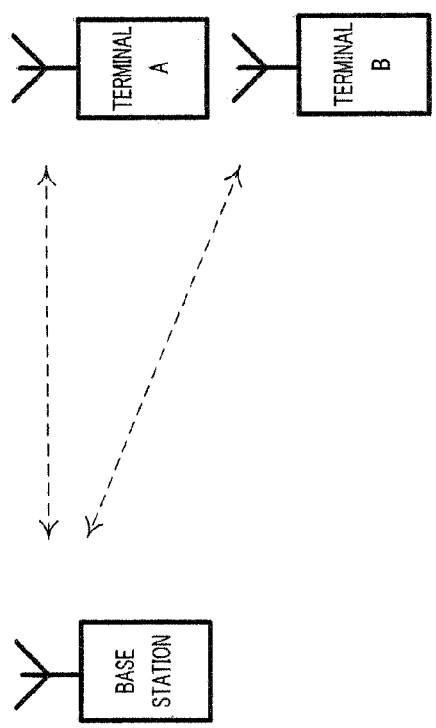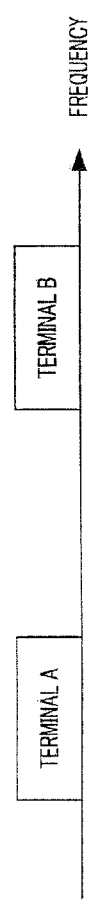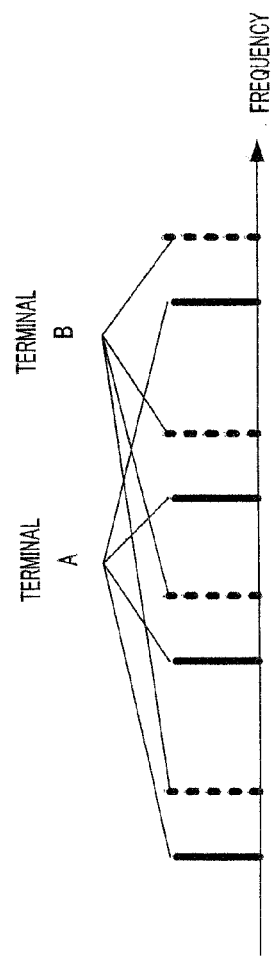
FIG. 1A
FIG. 1B
FIG. 1C
FIG. 1

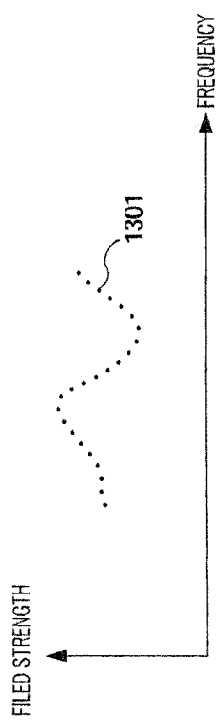
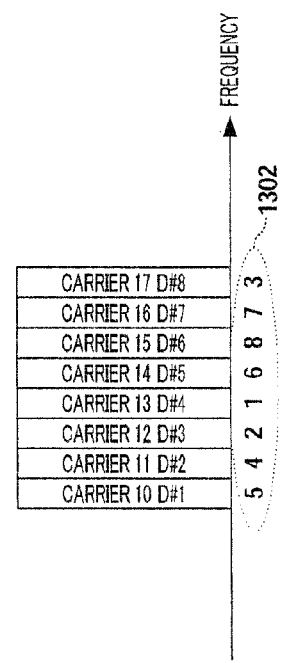
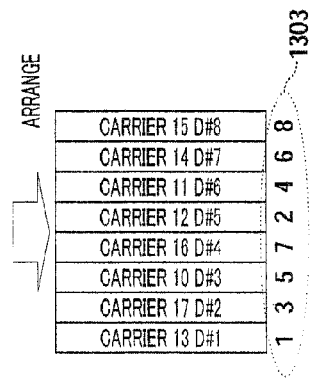
FIG.14A  FIG.14B  FIG.14C
FIG.14

RADIO COMMUNICATION METHOD AND RADIO COMMUNICATION DEVICE

TECHNICAL FIELD

The present invention relates to a wireless communication method and wireless communication apparatus. In particular, the present invention relates to a wireless communication method and wireless communication apparatus using the single carrier frequency division multiple access ("SC-FDMA") scheme.

BACKGROUND ART

Conventionally, the communication scheme called "localized SC-FDMA" for allocating frequencies in a localized manner and the communication scheme called "distributed SC-FDMA" for allocating frequencies in a distributed manner, are referred to as the communication scheme called SC-FDMA. These are disclosed in, for example, Non-Patent Document 1.

Localized SC-FDMA and distributed SC-FDMA will be explained using FIG. 1. FIG. 1A illustrates that a base station communicates with terminal A and terminal B.

FIG. 1B illustrates the frequency band allocation in the localized SC-FDMA scheme, and, to be more specific, FIG. 1B illustrates allocating a localized frequency band to terminal A and allocating a localized frequency band different from that allocated to terminal A, to terminal B. By this means, a base station can receive and demodulate signals transmitted at the same time from terminal A and terminal B at one time, thereby the base station can communicate with terminal A and terminal B at the same time.

FIG. 1C illustrates the frequency band allocation in the distributed SC-FDMA scheme, and, to be more specific, FIG. 1C illustrates allocating frequency band to terminal A and terminal B in a distributed manner. Similar to the localized SC-FDMA scheme, even in the case of the distributed SC-FDMA scheme, a base station can receive and demodulate signals transmitted at the same time from terminal A and terminal B at one time, thereby the base station can communicate with terminal A and terminal B at the same time.

However, the above-described SC-FDMA scheme has an advantage of making the power consumption in an apparatus lower than in the multicarrier communication scheme. That is, generally, when the peak-to-average power ratio ("PAPR") of a modulation signal is higher, the power consumption in the transmission power amplifier increases, thereby causing a proportional increase in the overall power consumption in the apparatus. However, the PAPR in the SC-FDMA scheme is lower than in the multicarrier communication scheme, thereby causing a proportional decrease in the power consumption.

Further, focusing on the SC-FDMA scheme, it is generally described that the PAPR is lower when frequency bands are allocated in a localized manner (i.e., in the localized SC-FDMA scheme) than when frequency bands are allocated in a distributed manner (i.e. in the distributed SC-FDMA scheme), and therefore that the power consumption is low.

Further, in the case of allocating frequency bands in a distributed manner (i.e. in the distributed SC-FDMA scheme), it is described that the PAPR can be made lower by allocating distributed frequencies according to rules than by allocating distributed frequencies in a random manner.

Non-Patent Document 1: "Investigation on optimum roll-off factor of a spectrum shaping filter for single-carrier FDMA radio access in evolved UTRA uplink," IEICE, RCS2005-148, January 2006

Non-Patent Document 2: "Digital Wireless Transmission Technology," Pearson Education, Seiichi Sanpei, Sep. 1, 2002

DISCLOSURE OF INVENTION

Problems to be Solved by the Invention

As described above, the SC-FDMA scheme has an advantage of reducing the power consumption in an apparatus than the multicarrier scheme, and is therefore considered suitable for apparatuses with limited battery capacity such as a terminal.

By the way, recently, in multi-antenna communication schemes represented by the MIMO (Multiple-Input Multiple-Output) communication scheme, by transmitting modulation signals from a plurality of antennas, it is possible to provide frequency diversity gain and spatial diversity gain.

However, in the conventional SC-FDMA scheme, multi-antenna transmission using a plurality of antennas is not discussed sufficiently. In a case where multi-antenna transmission is applied to the SC-FDMA scheme if frequencies are allocated to a plurality of antennas in an inadequate manner, it is even assumed that the quality degradation due to interference components exceeds the quality improvement by diversity gain. Therefore, a case is possible where the effect of improving the efficiency of frequency use by multi-antenna transmission cannot be expected.

It is therefore a main object of the present invention to provide a wireless communication method and wireless communication apparatus that can suppress the degradation of received quality due to interference and effectively improve the efficiency of frequency use by performing adequate frequency allocation in a plurality of antennas, in a case where the SC-FDMA scheme and multi-antenna transmission technology are combined.

Means for Solving the Problem

An aspect of the wireless communication method of the present invention is a wireless communication method for transmitting a SC-FDMA signal, including: a frequency allocating step of allocating frequency bands to a plurality of antennas of a terminal individually in a SC-FDMA scheme; and a selecting step of, when the frequency bands are allocated to the plurality of antennas, selecting between allocating different frequency bands to the plurality of antennas and allocating same frequency bands to the plurality of antennas, according to communication environment.

Further, an aspect of the wireless communication method of the present invention includes: the frequency allocating step comprises allocating localized frequency bands to the plurality of antennas of the terminal individually in a localized SC-FDMA scheme; and, when the localized frequency bands are allocated to the plurality of antennas, the selecting step comprises selecting between allocating different localized frequency bands to the plurality of antennas or allocating same localized frequency bands to the plurality of antennas, according to the communication environment.

Further, an aspect of the wireless communication method of the present invention includes: the frequency allocating step comprises allocating distributed frequency bands to the plurality of antennas of the terminal individually in a distributed SC-FDMA scheme; and, when the distributed frequency bands are allocated to the plurality of antennas, the selecting step comprises selecting between allocating different distributed frequency bands to the plurality of antennas and allocating same frequency bands to the plurality of antennas, according to the communication environment.

Further, an aspect of the wireless communication method of the present invention is a wireless communication method of a distributed SC-FDMA scheme for allocating distributed frequency bands to terminals, including: allocating frequency bands to a first terminal in the terminals in x carrier intervals; and allocating frequency bands to a second terminal in the terminals in y (x≠y) carrier intervals.

Further, an aspect of the wireless communication method of the present invention is a wireless communication method of a distributed SC-FDMA scheme for allocating distributed frequency bands to terminals, including changing allocation of frequencies to the terminals over time.

Further, an aspect of the wireless communication method of the present invention includes: in a base station, measuring received quality of a plurality of carriers that are allocated to a terminal; in the terminal, acquiring information about the received quality; and in the terminal, allocating transmission data to the plurality of carriers based on the information about the received quality such that the transmission data is not erroneous in a burst manner.

Further, an aspect of the wireless communication apparatus of the present invention is a wireless communication apparatus that transmits a SC-FDMA signal, including: a plurality of antennas; and a frequency allocating section that, when the frequency bands are allocated to the plurality of antennas, selects between allocating different frequency bands to the plurality of antennas and allocating same frequency bands to the plurality of antennas, according to a communication environment, and that performs frequency allocation.

Advantageous Effects of Invention

According to the present invention, it is mainly possible to realize a wireless communication method and wireless communication apparatus that can suppress the degradation of received quality due to interference and effectively improve the efficiency of frequency use in a case where the SC-FDMA scheme and multi-antenna transmission technology are combined.

BRIEF DESCRIPTION OF DRAWINGS

FIG. 1 illustrates localized SC-FDMA and distributed SC-FDMA;
FIG. 1A illustrates a system configuration;
FIG. 1B illustrates the frequency band allocation in the localized SC-FDMA scheme;
FIG. 1C illustrates the frequency band allocation in the distributed SC-FDMA scheme;
FIG. 5A illustrates channel fluctuations (i.e. propagation path fluctuations) between terminal A and base station in the frequency domain;
FIG. 5B illustrates a case where transmission signals (transmission streams) that are transmitted from different antennas are allocated to different frequency bands;
FIGS. 5C and 5D illustrate a case where transmission scheme using MIMO scheme is further used;
FIG. 7A illustrates a case where transmission signals (transmission streams) that are transmitted from different antennas are allocated to different frequency bands;
FIG. 7B illustrates a case where transmission scheme using MIMO scheme is further used;
FIG. 8A illustrates a case of allocating adjacent frequencies to terminals;
FIG. 8B illustrates a case where frequency allocation is performed without using adjacent carriers;
FIG. 8C illustrates a state where the number of accessing terminals increases;
FIG. 14 illustrates an example of a method of arranging the order of subcarriers according to Embodiment 4;
FIG. 14A illustrates channel fluctuations (i.e. propagation path fluctuations) between terminal A and base station in the frequency domain;
FIG. 14B illustrates the order of subcarriers and the order of received quality before arrangement;
FIG. 14C illustrates the order of subcarriers and the order of received quality after arrangement.

FIG. 22A illustrates an example of frequency allocation upon transmission of data that is not retransmission data;

FIG. 22B illustrates an example of frequency allocation upon transmission of retransmission data;

FIG. 25A illustrates an example of frequency allocation upon transmission of data that is not retransmission data;

FIG. 25B illustrates an example of frequency allocation upon transmission of retransmission data;

FIG. 26A illustrates an example of frequency allocation upon transmission of data that is not retransmission data;

FIG. 26B illustrates an example of frequency allocation upon transmission of retransmission data;

FIG. 27A illustrates an example of frequency allocation upon transmission of data that is not retransmission data;

FIG. 27B illustrates an example of frequency allocation upon transmission of retransmission data;

FIG. 28A illustrates an example of frequency allocation upon transmission of data that is not retransmission data;

FIG. 28B illustrates an example of frequency allocation upon transmission of retransmission data.

BEST MODE FOR CARRYING OUT THE INVENTION

Embodiments of the present invention will be explained below in detail with reference to the accompanying drawings.

Embodiment 1

Figure 2:
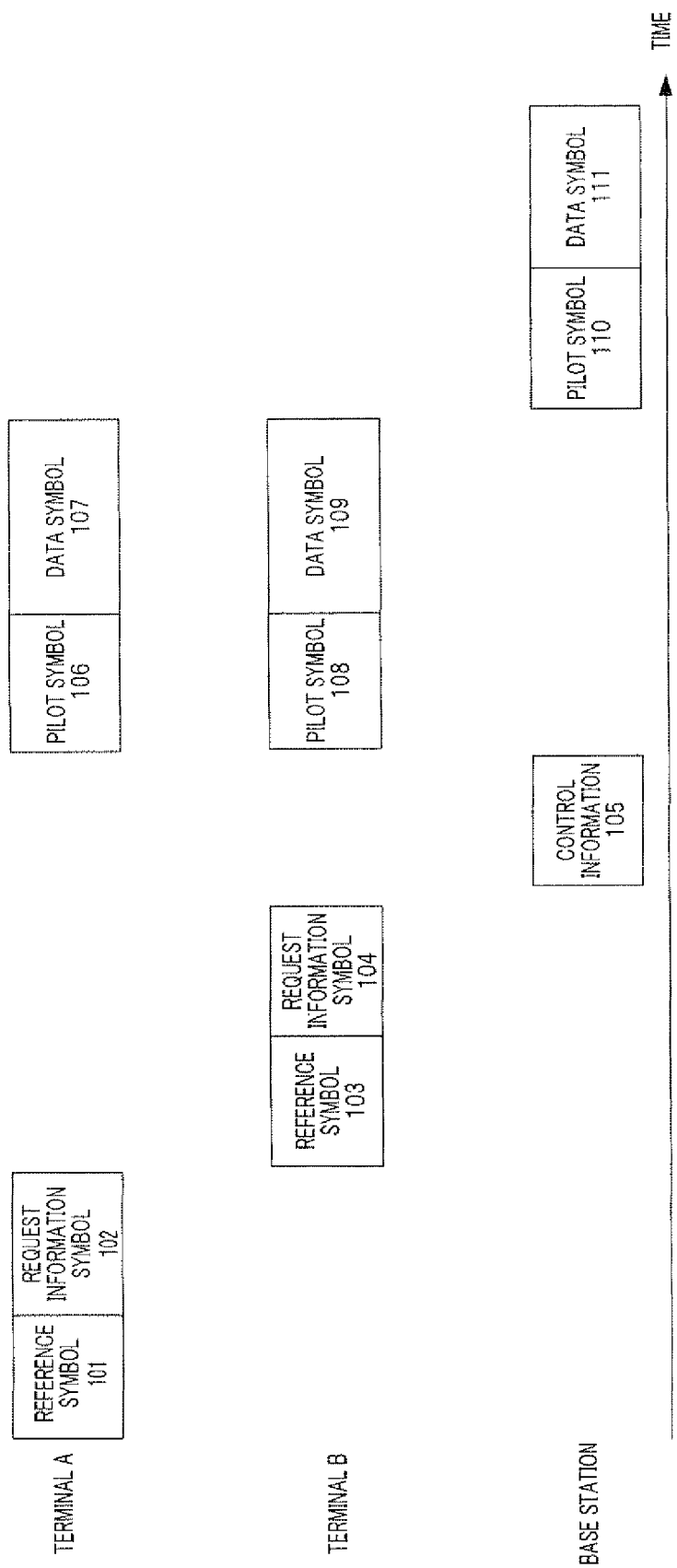
FIG. 2 illustrates transmission flow in a base station and terminals according to an embodiment of the present invention.

FIG. 2 illustrates an example of the transmission flow in a base station and terminals according to the present embodiment. Here, the relationships between the base station, terminal A and terminal B are illustrated in FIG. 1A. That is, terminal A and terminal B transmit the signals shown in FIG. 2 to the base station in uplink, while the base station transmits the signals shown in FIG. 2 to terminal A and terminal B in downlink.

First, terminal A transmits reference symbol 101 and request information symbol 102. Reference symbol 101 is, for example, a symbol whose signal point constellation on the I-Q plane is known between the transmitter and the receiver. Request information symbol 102 is a symbol including information about the transmission speed that is requested by the terminal, such as MCS (Modulation and Coding Scheme).

Next, terminal B transmits reference symbol 103 and request information symbol 104.

The base station estimates the propagation path conditions such as signal-to-interference and noise power ratio ("SINR") and the frequency fluctuation between the base station and terminal A and between the base station and terminal B, based on the reception states of reference symbols 101 and 103 transmitted in terminal A and terminal B. Based on these propagation path conditions, the base station determines the frequency allocation of modulation signals that are transmitted in terminal A and terminal B, and transmits control information symbol 105 including information about the determination.

Terminal A and terminal B receive control information symbol 105 and generate modulation signals based on the frequency allocation information included in control information symbol 105. Further, terminal A transmits pilot symbol 106 (e.g. a symbol whose signal point constellation on the I-Q plane is known between the terminal and the base station) and data symbol 107. Similarly, terminal B transmits pilot symbol 108 and data symbol 109. Here, terminal A and terminal B transmit data symbols 107 and 109 at the same time.

Next, the base station transmits pilot symbol 110 and data symbol 111 to the terminals.

Figure 3:
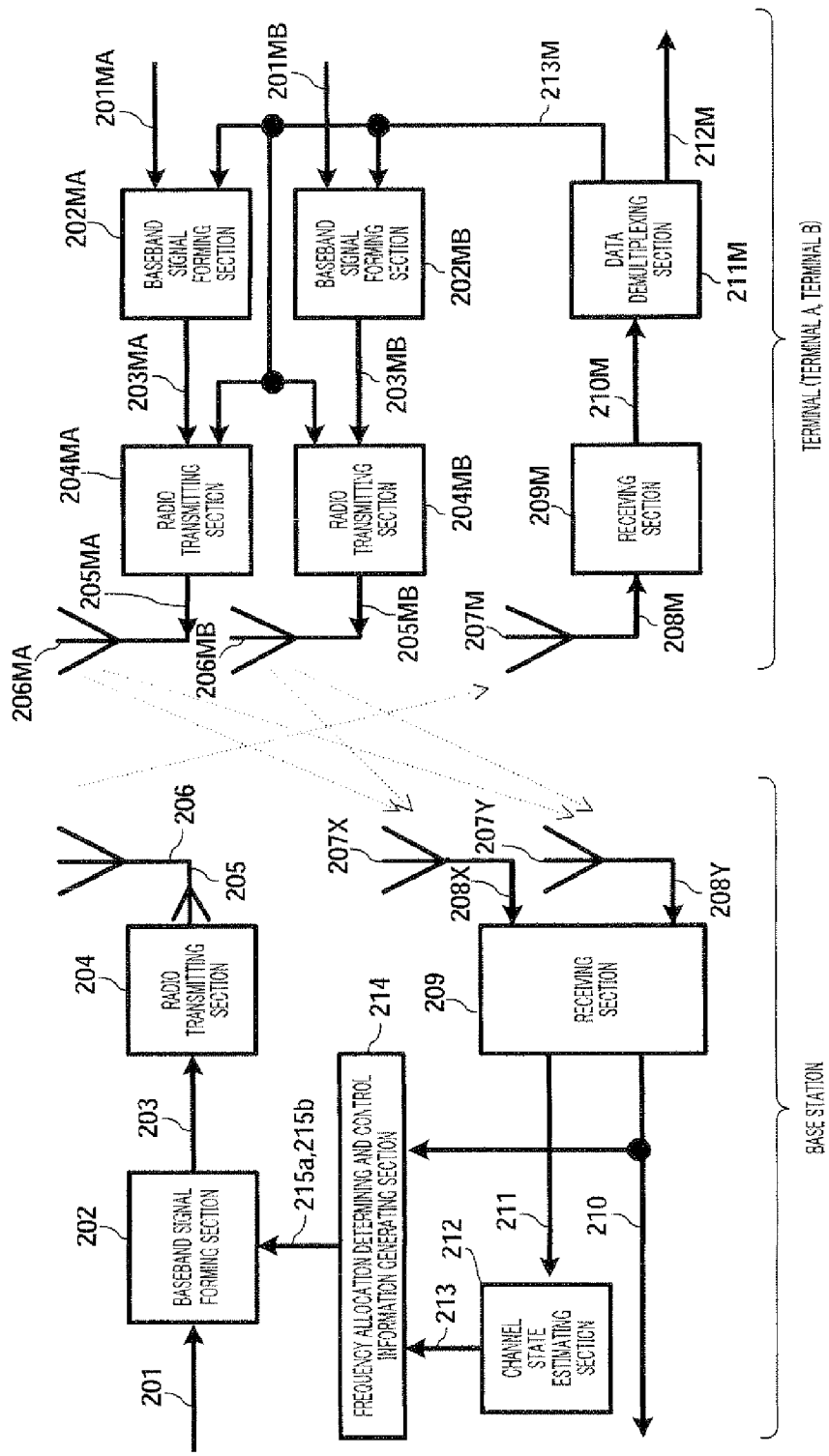
FIG. 3 is a block diagram, showing configuration examples of a base station and a terminal according to an embodiment.

FIG. 3 illustrates configuration examples of the base station and terminal (i.e. terminal A or terminal B) according to the present embodiment.

First, the transmission system in the base station will be explained. The base station inputs transmission data 201 and control information 215 in baseband signal forming section 202. Baseband signal forming section 202 performs coding and modulation processing of transmission data 201 based on control information 215a, and outputs baseband signal 203 in the frame configuration shown in FIG. 2.

Further, baseband signal forming section 202 inserts control information 215b, which is frequency allocation information, in baseband signal 203. Radio transmitting section 204 receives as input baseband signal 203, performs processing such as quadrature modulation, frequency conversion and signal amplification, and outputs transmission signal 205. Here, transmission signal 205 is outputted from antenna 206 in the form of radio waves.

Next, the reception system in the base station will be explained. The base station receives signals from terminals by a plurality of antennas 207X and 207Y. Receiving section 209 receives as input received signals 208X and 208Y, which are received by antennas 207X and 207Y, and acquires received data 210 by performing frequency conversion, quadrature demodulation, MIMO demultiplexing (such as ZF representing zero forcing and MLD representing maximum likelihood detection) and decoding.

Further, receiving section 209 acquires baseband signals 211 of reference symbols (i.e. reference symbols 101 and 103 in FIG. 2) transmitted in the terminals. Baseband signals 211 of the reference symbols are subjected to propagation path fluctuations. Channel state estimating section 212 generates channel state information 213 by estimating the conditions of the propagation environment in detail based on baseband signals 211 of the reference symbols, and outputs the result.

Frequency allocation determining and control information generating section 214 receives as input channel state information 213 and received data 210. Further, frequency allocation determining and control information generating section 214 extracts request information about the terminals (i.e. request information symbols 102 and 104) from received data 210, and, in accordance with this request information, transmits control information 215a to designate the modulation scheme, the coding rate and so on, to baseband signal forming section 202. Further, frequency allocation determining and control information generating section 214 determines frequency allocation in each terminal based on channel state information 213, and outputs information about the determined frequency allocation to baseband signal forming section 202 as control information 215b. Here, this control information 215b corresponds to control information symbol 105 in FIG. 2 and is transmitted to the terminals.

Next, the reception system in the terminals will be explained. The terminals receive a signal from the base station by antenna 207M. Receiving section 209M receives as input received signal 208M, which is received by antenna 207M, and acquires received data 210M by performing processing such as frequency conversion, quadrature demodulation and decoding. Data demultiplexing section 211M receives as input received data 210M, and demultiplexes received data 210M into data 212M and control information 213M.

Next, the transmission system in the terminals will be explained. The terminals inputs transmission data 201MA and control information 213M in baseband signal forming section 202MA, and inputs transmission data 201MB and control information 213M in baseband signal forming section 202MB. Baseband signal forming sections 202MA and 202MB form baseband signals 203MA and 203MB, respectively, by performing frequency allocation of transmission data 201MA and 201MB according to control information 213M in addition to coding and modulation processing.

Radio transmitting section 204MA receives as input baseband signal 203MA and control information 213M, radio transmitting section 204MB receives as input baseband signal 203MB and control information 213M, and radio transmitting sections 204MA and 204MB acquire modulation signals 205MA and 205MB, respectively, by performing processing such as frequency conversion and power amplification according to control information 213M. Further, modulation signals 205MA and 205MB are outputted in the form of radio waves from antennas 206MA and 206MB, respectively.

Figure 4:
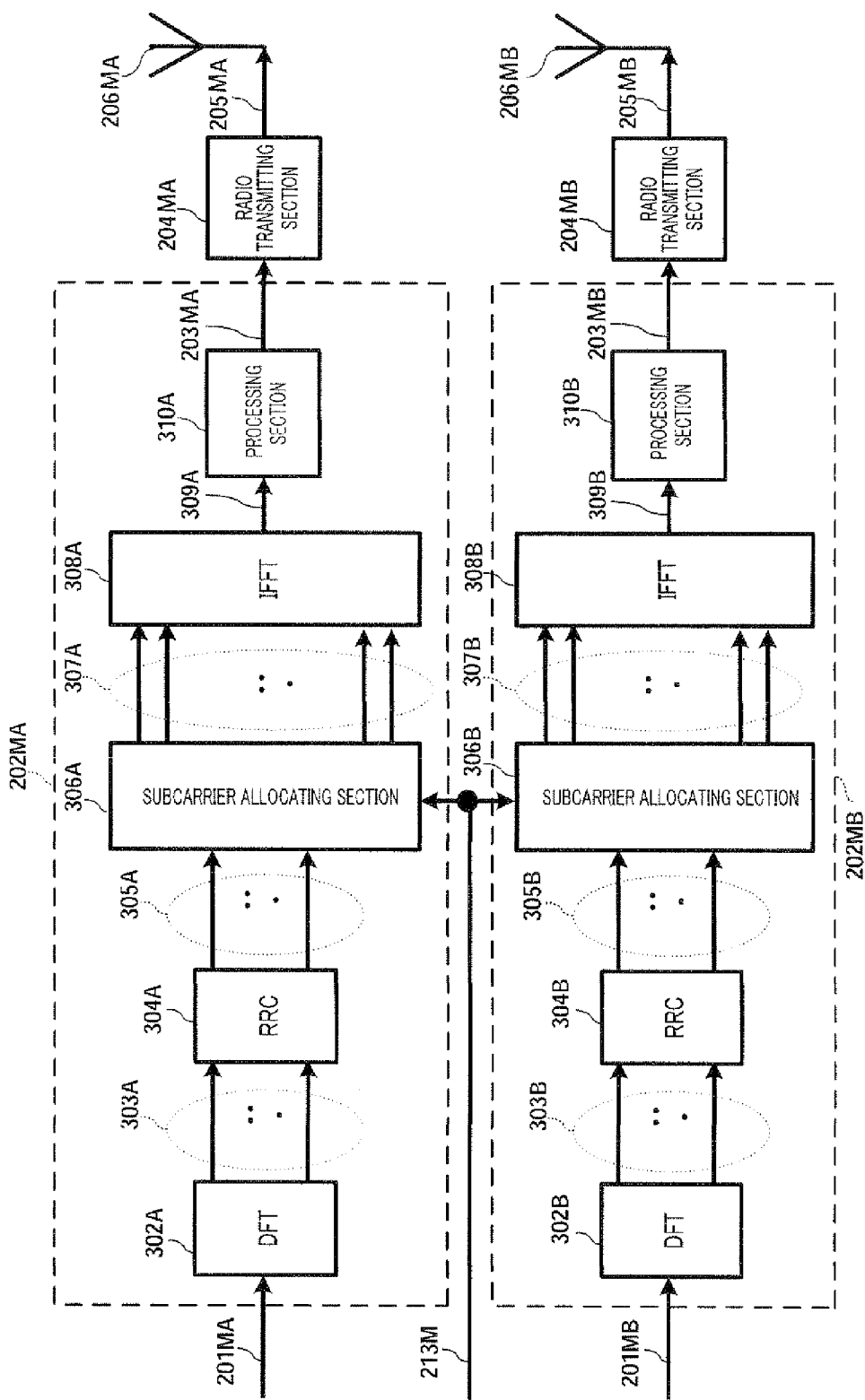
FIG. 4 is a block diagram showing a detailed configuration example of the transmission system in a terminal.

FIG. 4 illustrates a configuration example of the transmission system in the terminals in detail. As described above, the terminals input transmission data 201MA and transmission data 201MB in baseband signal forming section 202MA and baseband signal forming section 202MB, respectively. Actually, although baseband signal forming sections 202MA and 202MB both have a coding section and modulating section before discrete Fourier transform sections ("DFT") 302A and 302B, these sections are omitted in FIG. 4 for ease of drawing. Therefore, actually, DFT 302A and 302B in FIG. 4 receive as input transmission data 201MA and 201MB mapped in the modulation sections based on the modulation schemes.

DFT 302A receives as input mapped transmission data 201MA, performs the DFT for this transmission data 201MA, and outputs post-DFT signal group 303A. Route raised cosine ("RRC") 304A receives as input post-DFT signal group 303A and acquires band-limited signal group 305A by limiting the band of the post-DFT signal group 303A.

Subcarrier allocating section 306A receives as input band-limited signal group 305A and control information 213M, allocates band-limited signal group 305A to a frequency band based on control information 213M, and outputs post-frequency-allocation signal group 307A.

Inverse fast Fourier transform ("IFFT") 308A receives as input post-frequency-allocation signal group 307A, forms transmission baseband signal 309A by performing an IFFT for post-frequency-allocation signal group 307A, and outputs the result.

Processing section 310A receives as input transmission baseband signal 309A, performs cyclic prefix attaching processing and filtering processing by using a time window for transmission baseband signal 309A, and outputs the resulting transmission baseband signal 311A.

Further, baseband signal forming section 202MB has substantially the same configuration as baseband signal forming section 202MA, and therefore explanation of baseband signal forming section 202MB will be omitted.

Next, the operations of the present embodiment will be explained.

Figure 5:
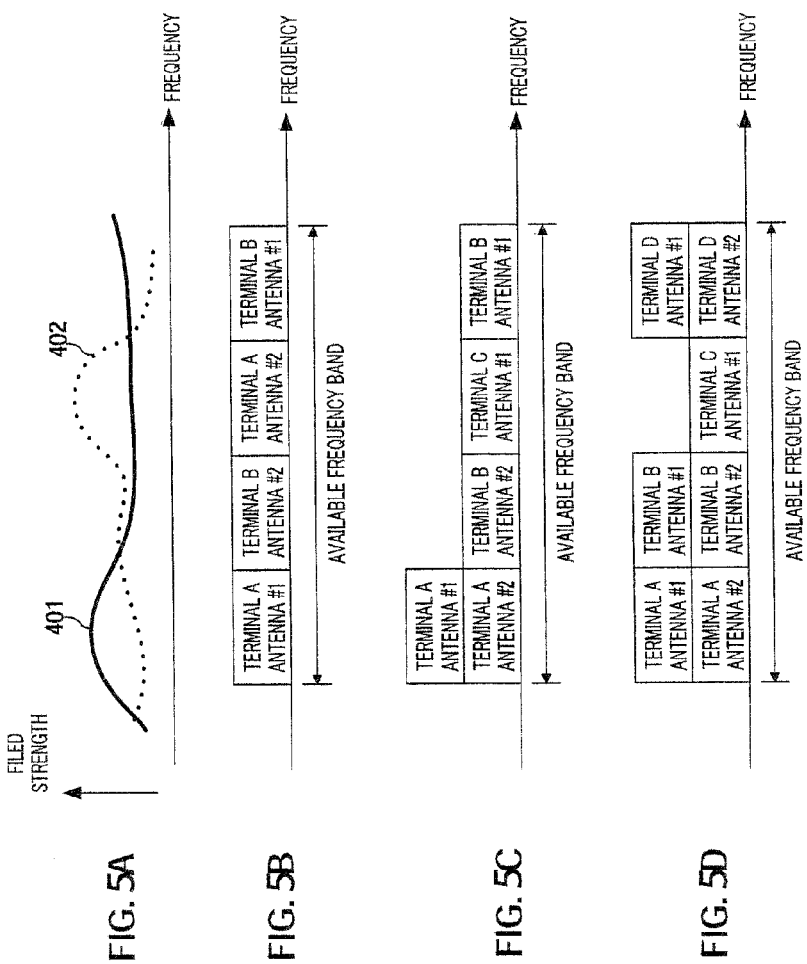
FIG. 5 illustrates an example of frequency allocation in terminals according to Embodiment 1.

First, a method of allocating frequency bands to the antennas of terminals will be explained using FIG. 5. Here, in FIG. 5, antenna #1 of terminal A refers to transmission signal 205MA that is transmitted from antenna 206MA in FIG. 4, and antenna #2 of terminal A refers to transmission signal 205MB that is transmitted from antenna 206MB in FIG. 4. FIG. 5 illustrates an example case where there are terminals A, B, C and D, and where each terminal has two antennas and transmits different transmission signals (transmission streams) from the respective antennas.

The terminals according to the present embodiment perform radio transmission in the localized SC-FDMA scheme. That is, signals of antennas are each allocated localized frequency bands, and transmission signals of localized frequency bands are transmitted from these antennas.

FIG. 5A illustrates channel fluctuations (i.e. propagation path fluctuations) in the frequency domain between terminal A and the base station. To be more specific, code 401 represents the channel fluctuations in antenna #1 of terminal A, and code 402 represents the channel fluctuations in antenna #2 of terminal A.

As shown in FIG. 5A, generally, the channel fluctuation characteristic varies between different antennas. Therefore, by performing transmission using the frequency bands with the higher field strength, it is possible to suppress the degradation of received quality. Further, by increasing the M-ary modulation number (e.g. by switching from QPSK to 16QAM) when the field strength in a frequency band is higher, it is possible to improve the transmission speed.

Therefore, as shown in FIG. 5B, by performing localized frequency allocation on a per antenna basis according to the channel fluctuation characteristic of each antenna of terminal A, it is possible to make transmission signals that are transmitted from each antenna of terminal A reach the base station in better conditions (e.g. better received quality and transmission speed).

Further, as shown in FIG. 5B, by allocating transmission signals (transmission streams) that are transmitted from different antennas of terminal A, to different frequency bands, it is possible to provide spatial diversity gain upon reception in the base station, compared to a case where MIMO (Multiple-Input Multiple Output) multiplexing transmission is performed.

By this means, compared to a case where transmission scheme using MIMO scheme is performed, it is possible to provide higher received quality and select a modulation scheme with a higher M-ary modulation number, thereby maintaining high received quality and high transmission speed. Further, "transmission scheme using MIMO scheme" is not limited to using different antennas of the same terminal but means using combinations of any antennas of all terminals.

According to the present embodiment, when the number of accesses to the base station (i.e. the number of terminals that perform uplink communication at the same time) is small in the available frequency band, as shown in FIG. 5B, the antennas of each terminal are allocated different localized frequency bands. By this means, it is possible to provide spatial diversity gain.

By contrast with this, according to the present embodiment, when the number of accesses to a base station (i.e. the number of terminals that perform uplink communication at the same time) increases in the available frequency band, it is not possible to allocate different frequencies to the transmission signals of all antennas. In this case, as shown in FIGS. 5C and 5D, transmission scheme using MIMO scheme (such as transmission scheme using MIMO spatial multiplexing) is further used.

To be more specific, in FIG. 5C, terminal A transmits different signals from antenna #1 and antenna #2, at the same time, using the same localized frequency band. By this means, compared to FIG. 5B, the localized frequency band which was allocated to antenna #2 of terminal A in FIG. 5B is not occupied, so that it is possible to allocate this unoccupied localized frequency band to antenna #1 of terminal C.

Further, in FIG. 5D, terminal A, terminal B and terminal D transmit different transmission signals from antenna #1 and antenna #2 of these terminals at the same time, using the same localized frequency bands. By this means, terminal D can also perform communication at the same time.

Figure 6:
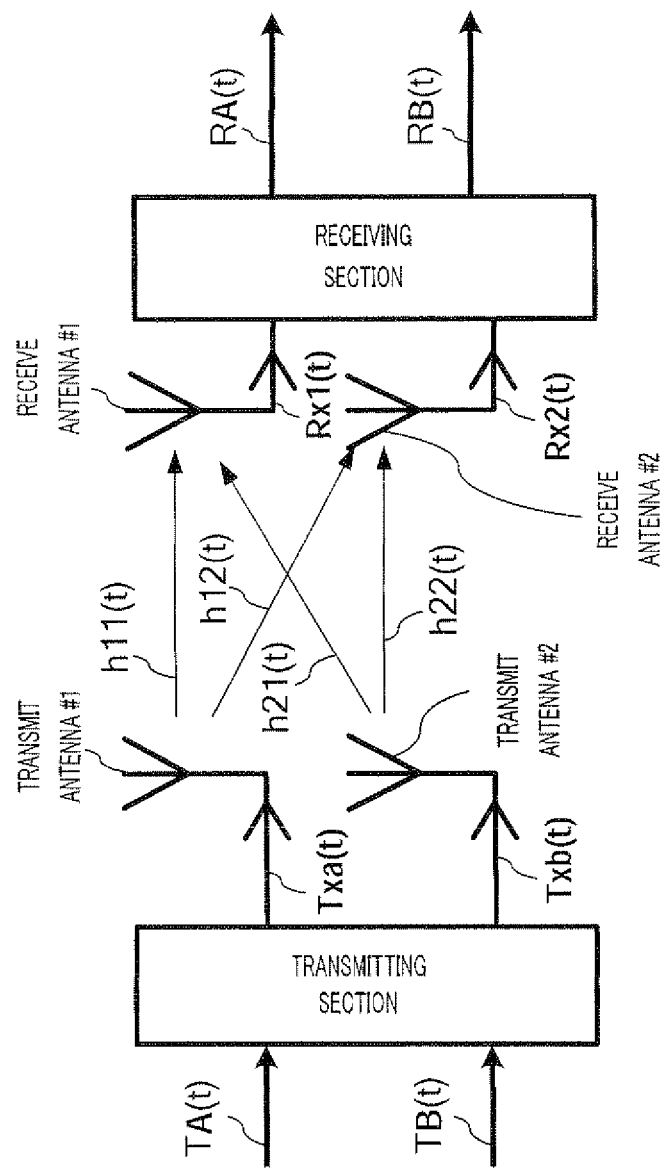
FIG. 6 illustrates a relationship between signals in a MIMO system using spatial multiplexing.

Here, using FIG. 6, signal demultiplexing processing on the receiving side upon transmission scheme using MIMO spatial multiplexing will be explained briefly. In FIG. 6, on the transmitting side, the transmitting section acquires modulation signals Txa(t) and Txb(t) from transmission data TA(t) and TB(t), respectively, and transmits these modulation signals from transmit antennas #1 and #2, respectively. On the receiving side, a receiving section receives as input received signals $Rx1(t)$ and $Rx2(t)$, which are received by receive antennas #1 and #2, and performs demodulation processing of these received signals $Rx(1)$ and $Rx2(t)$, thereby acquiring received data RA(t) and RB(t) associated with transmission data TA(T) and TB(t).

Here, modulation signal Txa(t) transmitted from transmit antenna #1 is subjected to channel fluctuations $h11(t)$ and $h12(t)$ and then received at receive antennas #1 and #2. Further, modulation signal Txb(t) transmitted from transmit antenna #2 is subjected to channel fluctuations $h21(t)$ and $h22(t)$ and then received at receive antennas #1 and #2.

Therefore, using time parameter t, let the signal transmitted from transmit antenna #1 be Txa(t), the signal transmitted from transmit antenna #2 be Txb(t), the signal received at receive antenna #1 be $Rx1(t)$, and the signal received at receive antenna #2 be $Rx2(t)$, the following equation holds. Further, $n1(t)$ and $n2(t)$ represent noise.

(Equation 1)

$$\begin{pmatrix} Rx1(t) \\ Rx2(t) \end{pmatrix} = \begin{pmatrix} h11(t) & h12(t) \\ h21(t) & h22(t) \end{pmatrix} \begin{pmatrix} Txa(t) \\ Txb(t) \end{pmatrix} + \begin{pmatrix} n1(t) \\ n2(t) \end{pmatrix} \quad [1]$$

Based on this relationship, using algorithms such as ZF and MLD, the base station demultiplexes modulation signals subjected to transmission scheme using MIMO spatial multiplexing in terminal A in FIG. 5C and terminal A, terminal B and terminal D in FIG. 5D. Further, channel fluctuation is estimated using pilot symbols transmitted from these terminals.

By the way, as shown in FIGS. 5C and 5D, an important point of the present embodiment is that, when transmission scheme using MIMO scheme is further used, transmission scheme using MIMO scheme is performed with a plurality of antennas of the same terminal. In other words, according to the present embodiment, the antennas to allocate the same localized frequency band to and perform transmission scheme using MIMO scheme are limited to a plurality of antennas of the same terminal. By this means, it is possible to maintain received quality at a base station.

For example, when transmission scheme using MIMO scheme is performed using antennas of different terminals such as when the same localized frequency band is allocated to antenna #1 of terminal A and antenna #1 of terminal B, the frequency source (i.e. frequency source of the synthesizer of the apparatus) varies between the terminals, and, furthermore, the positions of these terminals vary, and therefore the accuracy of frequency and time synchronization and the accuracy of frequency and time coherent characteristics degrade. As a result of this, is difficult to maintain received quality. According to the present embodiment, taking into account this point, antennas to allocate the same localized frequency band to and perform transmission scheme using MIMO scheme are limited to a plurality of antennas of the same terminal.

As described above, the present embodiment, adopting a localized SC-TDMA wireless communication method for allocating localized frequency bands to terminals, selects between allocating transmission signals (transmission streams) transmitted from different antennas, to different frequency bands individually and using MIMO scheme together, according to the number of terminals that access a base station in an available frequency band at the same time, and furthermore makes the number of terminals, in which transmission scheme using MIMO scheme is performed, variable according to the number of terminals that access the base station.

By this means, in a case where the localized SC-FDMA scheme and multi-antenna transmission technology are combined, it is possible to maintain the spatial diversity effect acquired by multi-antenna transmission as much as possible, allocate the limited, available frequency band to more terminals and perform multi-antenna transmission with high received quality. As a result, it is possible to realize a wireless communication method that can improve transmission quality, transmission speed and efficiency of frequency use.

Further, although a case has been described with the above embodiment where the number of terminals, in which transmission scheme using MIMO scheme is performed, variable according to the number of terminals that access a base station in the available frequency band at the same time, the number of terminals, in which transmission scheme using MIMO scheme is performed, may be changed according to, for example, channel fluctuation characteristic of the available frequency band.

Further, although a case has been described with the above embodiment where the present invention is mainly applied to radio transmission in the localized SC-FDMA scheme of allocating localized frequency bands to terminals, the present invention is not limited to this, but is also applicable to the distributed SC-FDMA of allocating distributed frequency bands to terminals. An embodiment will be explained below in a case where the present invention is applied to the distributed SC-FDMA scheme.

The transmission flow between a base station and terminals, the configurations of the base station and terminals, and details of the configuration of the terminals are the same as in FIG. 2, FIG. 3 and FIG. 4 described above.

An embodiment in a case where the present invention is applied to the distributed SC-FDMA scheme, differs from the case where the present invention is applied to the localized SC-FDMA scheme, in the method of allocating frequency bands to the antennas of terminals.

Figure 7:
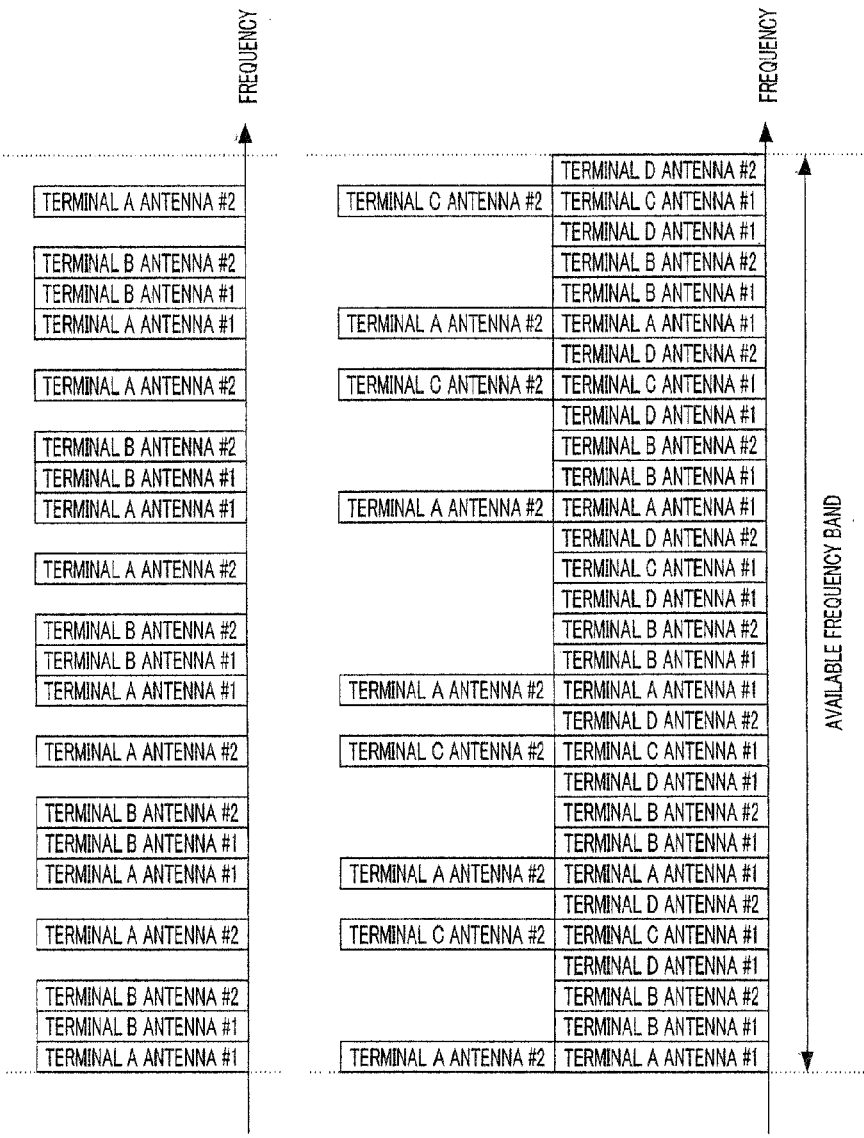
FIG. 7 illustrates an example of frequency allocation in terminals according to Embodiment 1.

FIG. 7 illustrates an example of a method of allocating frequency bands to the antennas of the terminals in a case where the present invention is applied to the distributed SC-FDMA scheme. Here, in FIG. 7, antenna #1 of terminal A represents transmission signal 205MA that is transmitted from antenna 206MA in FIG. 4, and antenna #2 of terminal A represents transmission signal 205MB that is transmitted from antenna 206MB in FIG. 4. FIG. 7 illustrates an example case where there are terminals A, B, C and D, and where each terminal has two antennas and transmit different transmission signals (transmission streams) from the respective antennas.

In the frequency allocation in FIG. 7, which naturally differs from the case of FIG. 5, for example, transmission signals from the antennas of each terminal are transmitted with different distributed frequency bands.

In the same way as described in FIG. 5A, generally, the channel fluctuation characteristic varies between different antennas. Therefore, by performing transmission using frequency bands with the higher field strength, and, furthermore, by increasing the M-ary modulation number (e.g. by switching from QPSK to 16QAM) when the field strength in a frequency band is higher, it is possible to suppress the degradation of received quality and improve the transmission speed.

Therefore, as shown in FIG. 7A, by setting up the distributed frequency allocation to vary between antennas, it is possible to make transmission signals that are transmitted from antenna reach the base station in better conditions (e.g. better received quality and transmission speed).

Further, as shown in FIG. 7A, by allocating transmission signals (transmission streams) that are transmitted from different antennas, to different frequency bands individually, it is possible to provide spatial diversity gain upon reception in the base station, compared to a case where transmission scheme using MIMO (Multiple-Input Multiple Output) multiplexing is performed. By this means, compared to a case where transmission scheme using MIMO scheme is performed, it is possible to provide higher received quality and select a modulation scheme higher M-ary modulation number, thereby maintaining high received quality and high transmission speed. Here, "transmission scheme using MIMO scheme" is not limited to using different antennas of the same terminal but means using combinations of any antennas of all terminals. Further, "different antennas" are not limited to different antennas of the same terminal but means all antennas of all terminals.

Here, when the number of accesses to a base station (i.e. the number of terminals that perform uplink communication at the same time) is small in the available frequency band, as shown in FIG. 7A, the antennas of each terminal are allocated different localized frequency bands. By this means, it is possible to provide spatial diversity gain. Further, in the distributed SC-FDMA scheme, a plurality of distributed frequency bands are allocated to the same antenna, so that it is generally possible to produce the higher frequency diversity effect than in the localized SC-FDMA scheme.

By contrast with this, when the number of accesses to a base station (i.e. the number of terminals that perform uplink communication at the same time) increases in the available frequency band, it is not possible to allocate different frequencies to transmission signals of all antennas. In this case, as shown in FIG. 7B, transmission scheme using MIMO scheme (such as transmission scheme using MIMO spatial multiplexing) is further used.

To be more specific, in FIG. 7B, terminal A and terminal C each transmit different transmission signals from antenna #1 and antenna #2 of these terminals at the same time, using the same localized frequency bands. By this means, compared to FIG. 7A, the distributed frequency band which was allocated to antenna #2 of terminal A in FIG. 7A is not occupied, so that it is possible to allocate this unoccupied distributed frequency band to terminal C.

Here, as shown in FIG. 7B, an important point is that, when transmission scheme using MIMO scheme is further used, the transmission scheme using MIMO scheme is performed with a plurality of antennas of the same terminal. In other words, the antennas to allocate the same distributed frequency band to and perform transmission scheme using MIMO scheme are limited to a plurality of antennas of the same terminal. By this means, it is possible to maintain received quality at the base station.

For example, when transmission scheme using MIMO scheme is performed using antennas of different terminals such as when the same distributed frequency band is allocated to antenna #1 of terminal A and antenna #1 of terminal B, the frequency source (i.e. frequency source of the synthesizer of the apparatus) varies between the terminals, and, furthermore, the positions of these terminals vary, and therefore the accuracy of frequency and time synchronization and the accuracy of frequency and time coherent characteristics degrade. As a result, it is difficult to maintain received quality.

According to the present embodiment, taking into account this point, antennas to allocate the same distributed frequency band to and perform transmission scheme using MIMO scheme are limited to a plurality of antennas of the same terminal.

As described above, in the wireless communication method adopting a distributed SC-FDMA scheme for allocating distributed frequency bands to terminals, whether to allocate transmission signals (transmission streams) transmitted from different antennas, to different frequency bands individually or use MIMO scheme together, is selected according to the number of terminals that access a base station in an available frequency band at the same time, and furthermore, the number of terminals, in which transmission scheme using MIMO scheme is performed, is made variable based on the number of terminals that access the base station.

By this means, in a case where the distributed SC-FDMA scheme and multi-antenna transmission technology are combined, it is possible to maintain the spatial diversity effect acquired by multi-antenna transmission as much as possible, allocate the limited, available frequency band to more terminals and perform multi-antenna transmission with high received quality. As a result, it is possible to realize a wireless communication method that can improve transmission quality, transmission speed and efficiency of frequency use.

Further, although a case has been described with the above embodiment where the present invention is applied to a multi-antenna system in which the number of transmit antennas is two and the number of receive antennas is two, the present invention is not limited to this, but is also applicable to a wide range of cases where the number of receive antennas is two or more, the number of transmit antennas is two or more and the number of transmission modulation signals is two or more.

Further, although an example case has been described with the above embodiment where transmission scheme using MIMO spatial multiplexing is used as transmission scheme using MIMO scheme, the transmission scheme using MIMO scheme is not limited to this, and, for example, it is equally possible to implement the present invention in the same manner using eigenmode transmission. That is, the transmission scheme using MIMO scheme is not an essential matter of the present invention, and, even if any schemes are used, it is equally possible to implement the present invention and produce the same influence.

Embodiment 2

The present embodiment proposes to make the rule of frequency allocation vary between terminals in the distributed SC-FDMA scheme.

Figure 8:
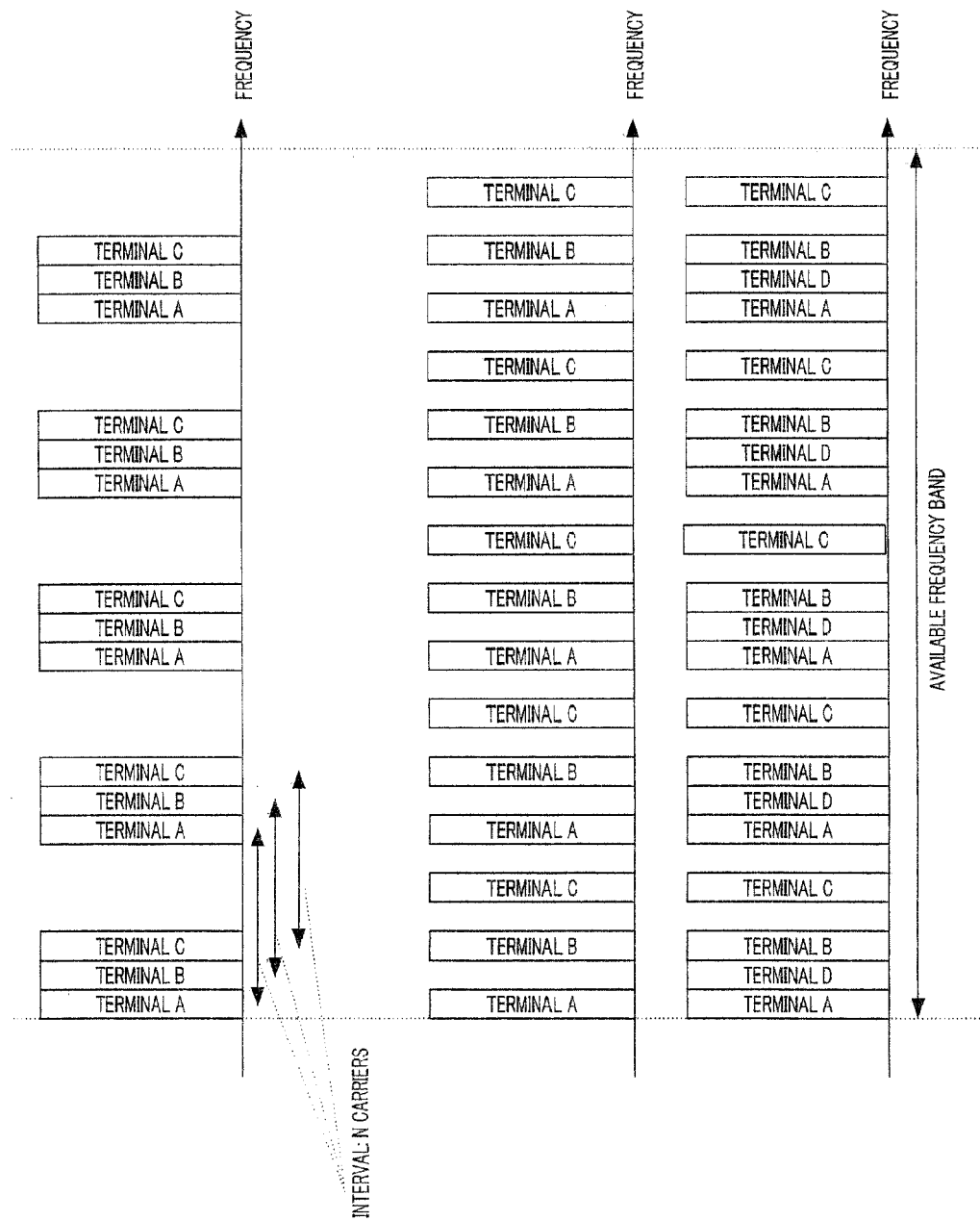
FIG. 8 illustrates an example of frequency allocation in terminals according to Embodiment 2.

First, before explaining the present embodiment, process arriving at the present embodiment will be explained using FIG. 8. FIG. 8 illustrates an example of a method of frequency allocation in the distributed SC-FDMA scheme. A feature of FIG. 8 lies in allocating frequencies to all of terminal A, terminal B and terminal C at the same intervals of N carriers in a distributed manner.

FIG. 8A illustrates a case where adjacent frequencies are allocated to terminal A, terminal B and terminal C. In this case, in FIG. 8A, although frequencies to allocate are different, terminal A, terminal B and terminal C all have different internal frequency sources, and, consequently, in fact, there is a high possibility that all carriers interfere with each other. Therefore, degradation of received quality is caused.

As shown in FIG. 8B, a method of not using adjacent carriers is one possible method of suppressing interference. If the frequency allocation shown in FIG. 8B is performed, adjacent carriers are not used, and, consequently, the efficiency of frequency use degrades. Further, if terminal D additionally makes an access as shown in FIG. 8C, it has no choice but to allocate adjacent carriers. As a result, finally, terminal A, terminal B, terminal C and terminal D interfere with each other in all carriers, and therefore received quality degrades.

Figure 9:
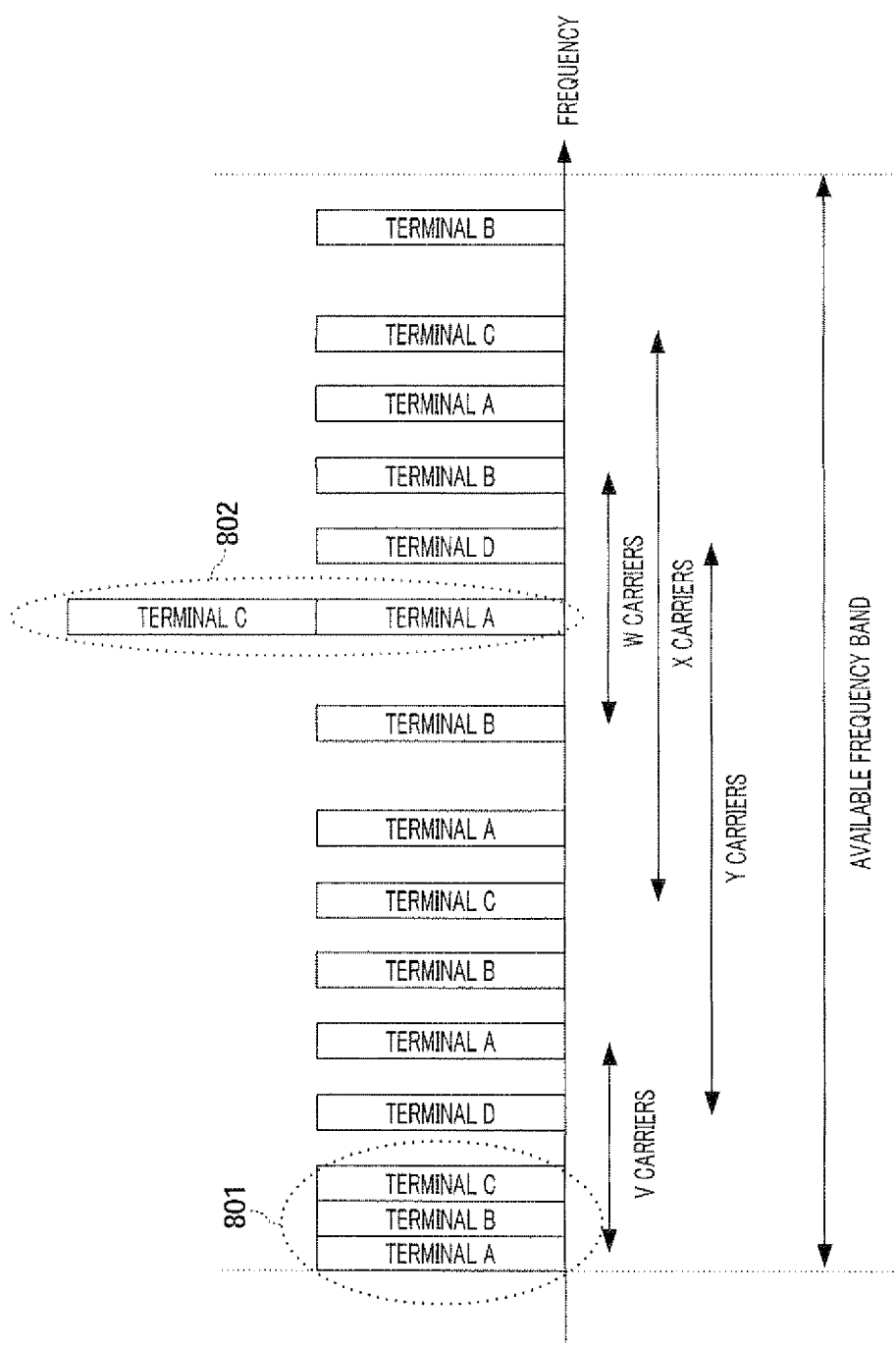
FIG. 9 illustrates an example of frequency allocation in terminals according to Embodiment 2.

In view of the above-described consideration, the present embodiment proposes the frequency allocation shown in FIG. 9.

In FIG. 9, frequency bands are allocated to terminal A at V carrier intervals, terminal B at W carrier intervals, terminal C at X carrier intervals, and terminal D at Y carrier intervals, where, these carrier intervals V, W, X and Y hold the relationship of V≠W≠X≠Y.

Thus, when distributed frequency bands are allocated to a plurality of terminals, distributed frequency bands are allocated in the terminals at individual carrier intervals, so that the base station can decode signals from these terminals with good error rate performance.

This will be explained. As known from FIG. 9, frequencies of significant interference are the frequencies designated by the codes 801 and 802 in FIG. 9. However, the number of carriers of significant interference is only two at terminal A, only one at terminal B and only two at terminal C, and, contrary to what is illustrated in FIGS. 8A and 8C, there is no terminal at which interference is significant in all carriers. Therefore, in each terminal, not all carriers have low received quality, and, consequently, by performing error correction using convolutional code, turbo code or LDPC code on the terminal side and performing error correction decoding on the base station side, it is possible to produce the effect of improving error rate performance by error correction processing. As a result, it is possible to prevent an occurrence of a terminal of extremely poor error rate performance.

Further, although the applicable range of the method of frequency allocation of the present embodiment is not limited to a multi-antenna communication system, if the method is applied to the multi-antenna communication system described in Embodiment 1, it is also possible to produce the following influences.

That is, from the signals in the frequency band designated by the code 802 in FIG. 9, a base station can separate the signal of terminal A and the signal of terminal C using signal demultiplexing algorithms such as ZF and MLD, so that it is possible to ensure received quality. Further, for the other carrier signals than the codes 801 and 802, the base station receives these signals by a plurality of antennas, so that it is possible to provide spatial diversity gain and excellent received quality.

As described above, according to the present embodiment, by allocating distributed frequency bands to terminals at different carrier intervals, in a wireless communication method of the distributed SC-FDMA scheme, the receiving side (i.e. base station side) can acquire received data of good error rate performance.

Further, although allocation of distributed frequency bands to four terminals A to D has been described with the above embodiment, the present invention is not limited to this, but is also applicable to a wide range of cases in which distributed frequency bands are allocated to two or more terminals. That is, by allocating frequency bands to a first terminal in a plurality of terminals at x carrier intervals and allocating frequency bands to a second terminal in the plurality of terminals at y (x≠y) carrier intervals, it is possible to produce the same influence as in the embodiment described above.

Further, although a case has been described with the above embodiment where distributed frequency bands are allocated to four terminals A to D at different carrier intervals (i.e. carrier intervals V, W, X and Y are set to hold the relationship of V≠W≠X≠Y), it is not necessary to always set all carrier intervals different, and it is possible to produce the advantageous influence at a certain level by setting different carrier intervals between two or more terminals.

Further, in addition to the above-described embodiment, by selecting the values of V, W, X and Y such that the lowest common multiple of V, W, X and Y is V×W×X×Y, it is possible to significantly lower the possibility that terminals A to D interfere with each other, so that it is more effective. Further, referring to the relationship between two terminals, the essential requirement is to allocate frequency bands to the first terminal at x carrier intervals, allocate frequency bands to the second terminal at y (x≠y) carrier intervals and select the values of x and y such that the lowest common multiple of x and y is x×y.

Further, although a case has been described with the above embodiment where distributed frequency bands are allocated to terminals at different carrier intervals, the essential requirement is to change the rule of frequency allocation between terminals.

Further, in the above-described embodiment, the rule of frequency allocation to each terminal may be changed according to the number of accessing terminals. For example, when the number of terminals that access a base station is small, as shown in FIG. 8, it may be possible to perform frequency allocation not using adjacent carriers.

Therefore, when the number of terminals that access a base station is small, frequency allocation may be performed as shown in FIG. 8B. Further, when the number of terminals that access a base station is large, frequency allocation may be performed as shown in FIG. 9. Even in this case, as in the above-described embodiment, it is possible to acquire received data of good error characteristics on the receiving side. That is, it is not necessary to always change the rule of frequency allocation to each terminal.

Embodiment 3

The present embodiment proposes changing carriers to allocate to terminals over time in the distributed SC-FDMA scheme.

The method of frequency allocation according to the present embodiment will be explained using FIGS. 10 and 11. Here, FIG. 10 illustrates the method of frequency allocation according to the present embodiment, and FIG. 11 illustrates a comparison example of FIG. 10.

Figure 10:
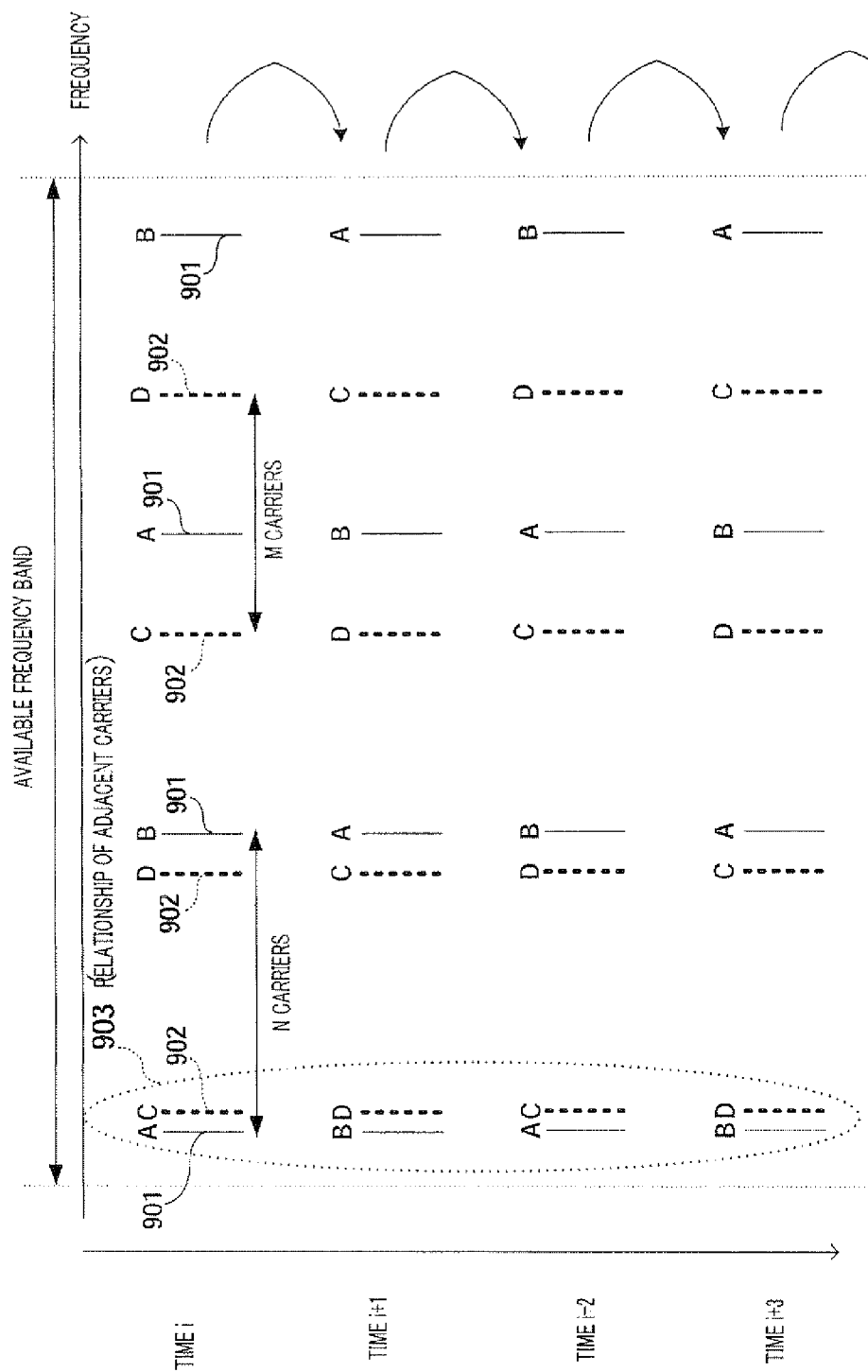
FIG. 10 illustrates an example of frequency allocation in terminals according to Embodiment 3.
Figure 11:
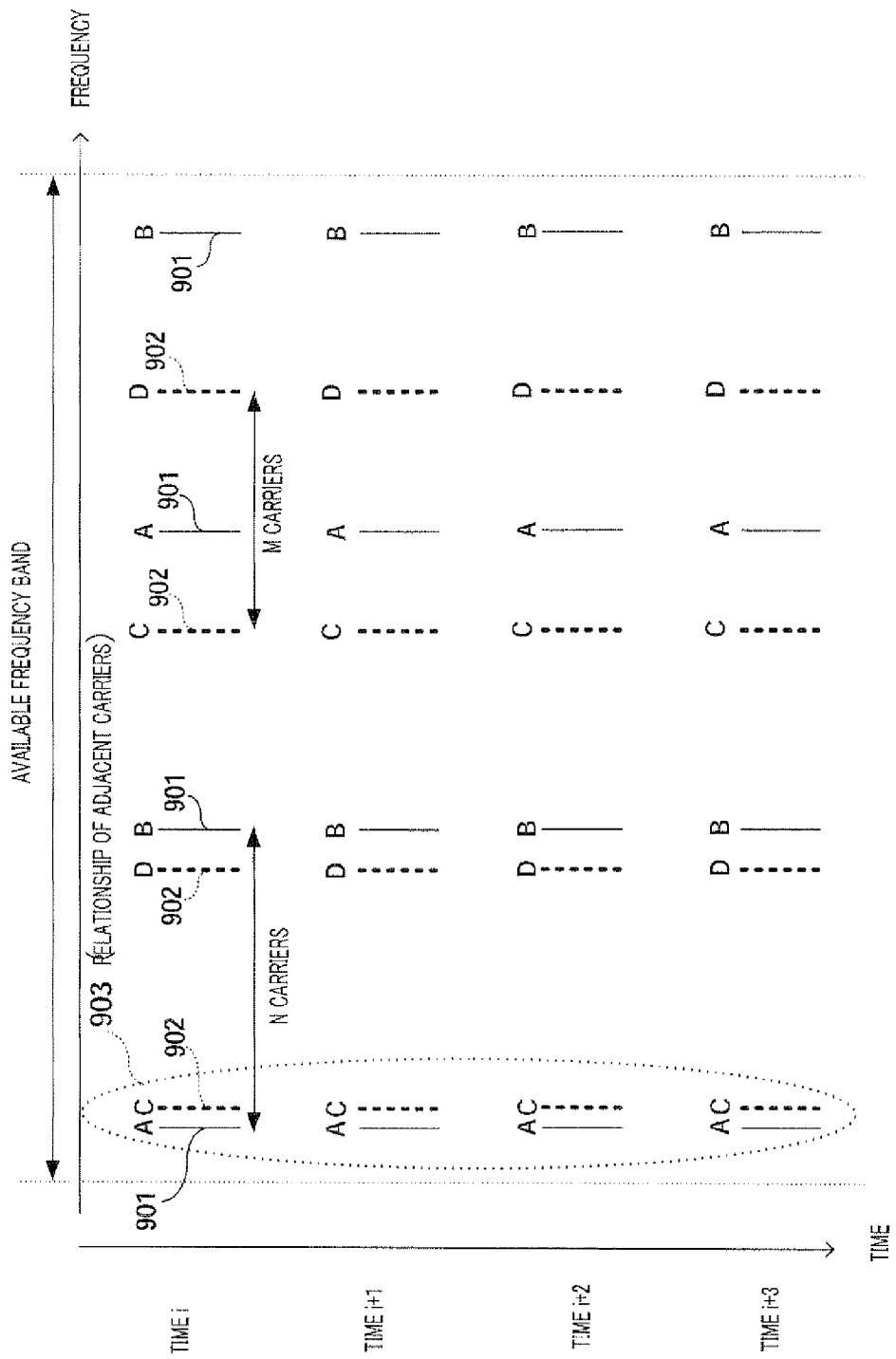
FIG. 11 illustrates an example of frequency allocation in terminals as a comparison example according to Embodiment 3.

In FIGS. 10 and 11, the horizontal axis is frequency, and the vertical axis is time. Further, the solid-line carriers designated by the code 901 are carriers that are allocated at N carrier intervals in the distributed SC-FDMA scheme, and the dotted-line carriers designated by the codes 902 are carriers that are allocated at M carrier intervals in the distributed SC-FDMA scheme, where, N and M hold the relationship of $N \neq M$. Further, the code 903 designates carriers having the relationship of adjacent carriers. The relationship of adjacent carriers indicates carriers allocated adjacent to each other, without carrier intervals in the frequency domain.

As explained in Embodiment 2, the frequency sources inside the terminals are different from each other, and, as a result, interference increases between carriers having the relationship of adjacent carriers designated by the code 903 and received quality degrades. FIGS. 10 and 11 illustrate examples where a combination of carriers having a relationship of adjacent carriers designated by code 903 is provided in each time.

Further, in FIGS. 10 and 11, "A," "B," "C" and "D" designate carriers allocated to "terminal A," "terminal B," "terminal C" and "terminal D," respectively. Here, terminal A and terminal B share and use carrier 901 allocated frequencies at N carrier intervals in the distributed SC-FDMA scheme (in this case, the carrier interval between terminal A's or terminal B's is 2N). Further, terminal C and terminal D share and use carrier 902 allocated frequencies at M carrier intervals in the distributed SC-FDMA scheme (in this case, the carrier interval between terminal C's or terminal D's is 2M).

According to the present embodiment, as shown in FIG. 10, frequency allocation to terminals varies over time. By this means, a carrier adjacent to a carrier used by another terminal is made sure not to consecutively allocate to the same terminal in consecutive times. As a result, in each terminal, it is possible to reduce the number of times carriers having the relationship of adjacent carriers are allocated, thereby alleviating the influence of adjacent carriers.

By contrast with this, as shown in FIG. 11, when frequency allocation to terminals is not changed over time, that is, when frequency allocation to terminals is not changed between times i, +1, i+2 and i+3, the number of times carriers having the relationship of adjacent carriers occur is very large in terminals A and C. On the other hand, in terminals B and D, there are no carriers having the relationship of adjacent carriers. This case causes an imbalance, that is, terminal A and terminal C provide low received quality while terminal B and terminal D provide high received quality.

On the other hand, as shown in FIG. 10, when frequency allocation to terminals is changed over time, that is, when frequency allocation to terminals is changed between times i, i+1, i+2 and i+3, the number of times carriers of low received quality (i.e. carriers having the relationship of adjacent carriers) occur is substantially the same between terminals. In other words, the imbalance in the number of times carriers of low received quality (i.e. carriers having the relationship of adjacent carriers) occur is alleviated between terminals.

By this means, as explained in Embodiment 2, by performing error correction using convolutional code, turbo code or LDPC code on the terminal side and performing error correction decoding on the base station side, it is possible to produce the effect of improving error rate performance by error correction processing. As a result, it is possible to prevent an occurrence of a terminal of extremely poor error rate performance.

As described above, according to the present embodiment, in a wireless communication method of the distributed SC-FDMA scheme for allocating distributed frequency bands to terminals, by changing frequency allocation to terminals over time, the imbalance in the number of times carriers of low received quality (i.e. carriers having the relationship of adjacent carriers) occur can be alleviated between terminals, so that it is possible to acquire received data of good error rate performance on the receiving side (i.e. on the base station side).

Further, according to the conditions of communication, the number of accesses to a base station, and so on, it may be adopted to select both a case where frequency allocation to terminals is changed over time and a case where frequency allocation to terminals is not changed over time.

Further, if the method of frequency allocation according to the present embodiment is applied to a terminal that performs transmission scheme using MIMO scheme, it is possible to acquire the same influence as the above-described embodiment. Further, if the method of frequency allocation according to Embodiment 1 is used together, it is possible to acquire the same influence as the above-described embodiment. In this case, the essential requirement is to change frequency allocation per terminal over time and change frequency allocation per antenna of each terminal over time.

Embodiment 4

A method of allocating symbols to subcarriers in the SC-FDMA scheme will be explained with the present embodiment. The present embodiment mainly suggests a method of allocating symbols to subcarriers in the localized SC-FDMA scheme.

Figure 12:
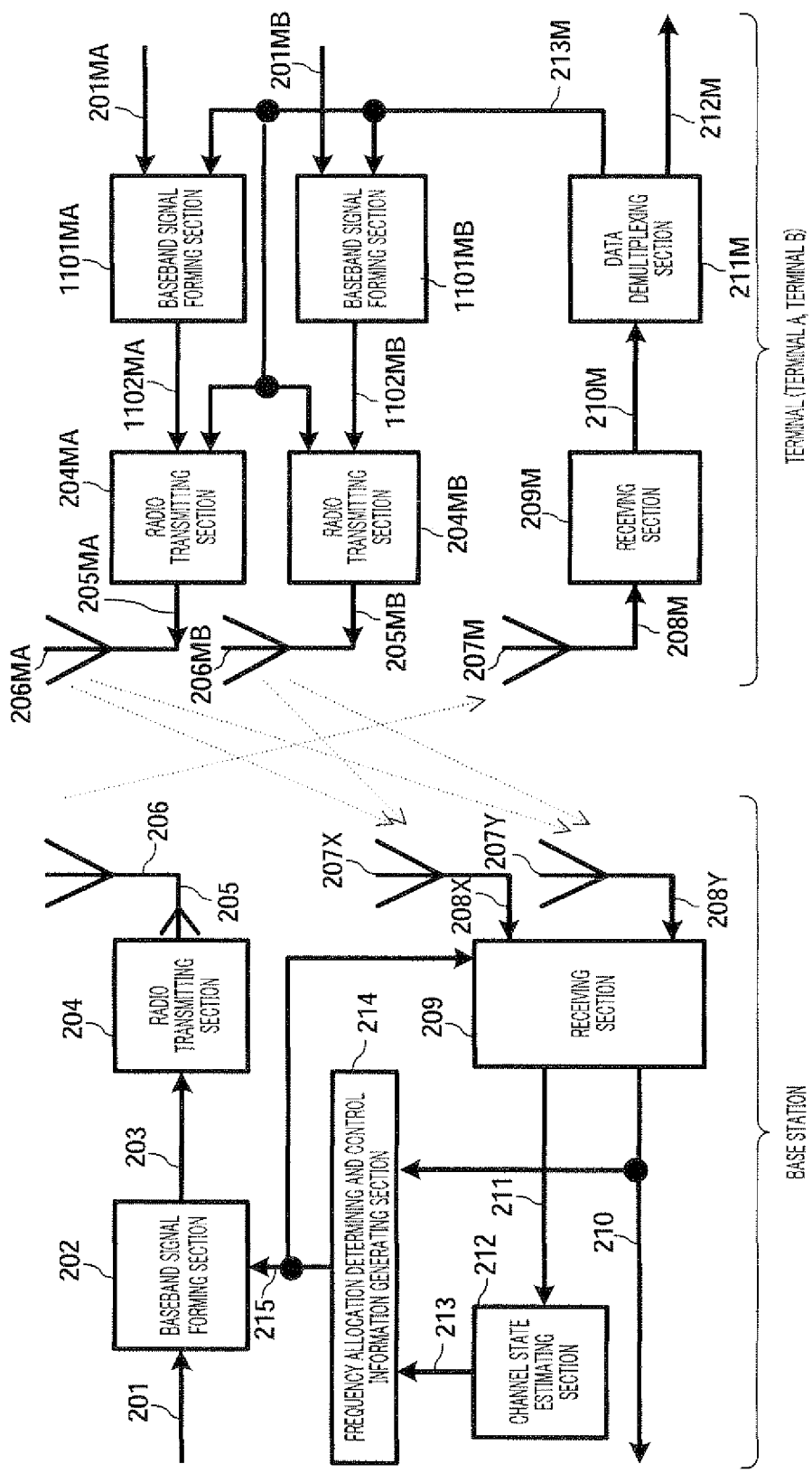
FIG. 12 is a block diagram showing configuration examples of a base station and terminal according to Embodiment 4.

FIG. 12, which is assigned the same reference numerals to the same components as in FIG. 3, illustrates configuration examples of the terminals and base station according to the present embodiment. The configuration of FIG. 12 differs from FIG. 3 in that control information 215 is received as input in receiving section 209 of the base station, and in the configurations of baseband signal forming sections 1101MA and 1101MB in the terminals.

Figure 13:
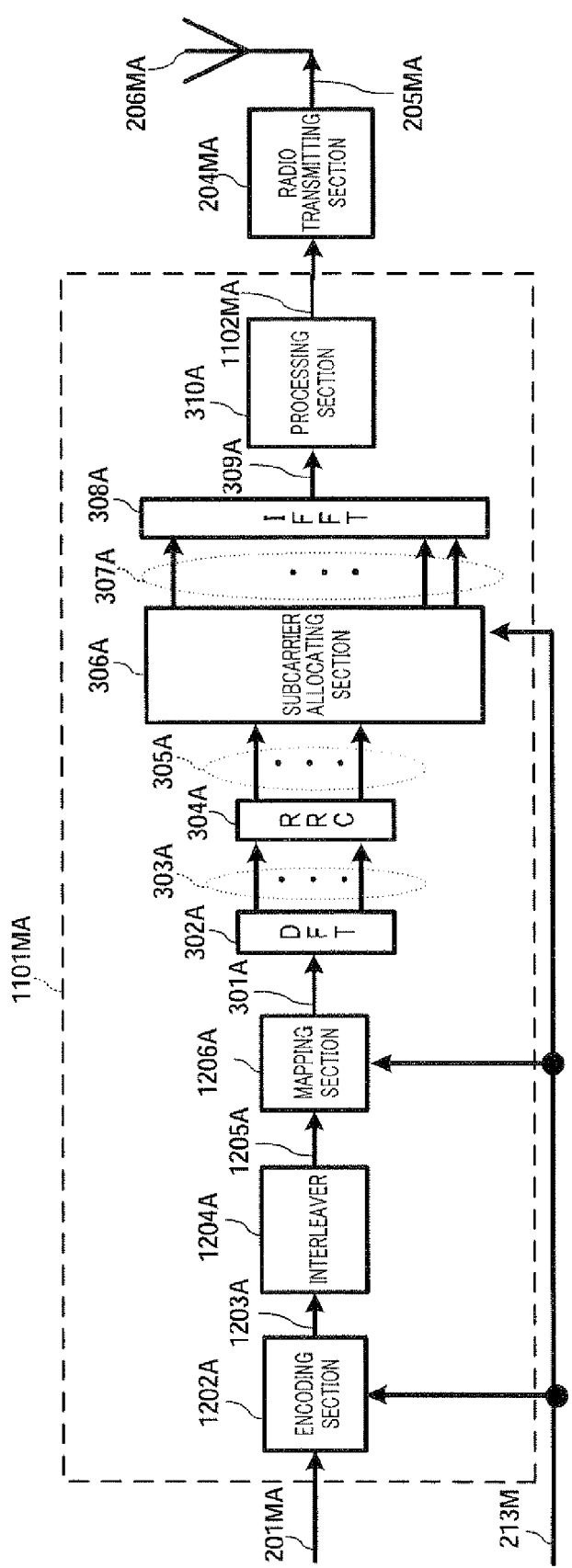
FIG. 13 is a block diagram showing a detailed configuration example of the transmission system in a terminal according to Embodiment 4.

FIG. 13, which is assigned the same reference numerals to the same components as in FIG. 4, illustrates the configuration of the transmission system of the terminals in detail. Further, for ease of drawing, FIG. 13 illustrates only the transmission system associated with transmit antenna 206MA, and omits the transmission system associated with transmit antenna 206MB.

Encoding section 1202A receives as input transmission data 201MA and control information 213M, and acquires encoded data 1203A by performing coding according to the coding method and coding rate included in control information 213M. Interleaver 1204A receives as input encoded data 1203A and acquires interleaved data 1205A by interleaving the order of the data. Mapping section 1206A receives as input interleaved data 1205A and control information 213M, and acquires mapping signal 301A by performing modulation according to the modulation scheme included in control information 213M.

Unlike the processing of FIG. 4, subcarrier allocating section 306A according to the present embodiment receives as input band-limited signal group 305A and control information 213M. Subcarrier allocating section 306A determines the subcarriers to use based on frequency allocation information included in control information 213M received as input, and, in addition, determines the allocation of symbols to the subcarriers based on received quality information per subcarrier included in control information 213M, and outputs post-frequency-allocation signal group 307A. The method of allocating symbols to subcarriers in this case will be explained below in detail.

FIG. 14 illustrates an example of the method of allocating symbols to subcarriers according to the present embodiment. Here, an example case will be explained where interleaver 1204A of the terminal in FIG. 13 does not interleave the order of data and where the modulation scheme is BPSK.

FIG. 14A illustrates that the horizontal axis is frequency, and the vertical axis is field strength per subcarrier when a terminal receives subcarrier signals.

FIG. 14B illustrates the subcarrier numbers in localized frequency bands upon allocating localized frequencies to the terminal, and a state where numbers 1302 are put in ascending order from higher subcarriers to lower subcarriers as to field strength 1301.

In FIG. 14B, D#1, D#2, D#3, D#4, D#5, D#6, D#7 and D#8 represent the order of data in interleaved signal 1205A in FIG. 13. If interleaver 1204A of the terminal in FIG. 13 does not interleave the order of data and the modulation scheme is BPSK, data D#1, D#2, D#3, D#4, D#5, D#6, D#7 and D#8 are transmitted by sequential subcarriers, as shown in FIG. 14B.

In the localized SC-FDMA scheme, the correlation of channel fluctuations is high between neighboring subcarriers and the number of subcarriers to use is small, and, consequently, this scheme has a feature that the random characteristics of data are difficult to ensure by an interleaver. Conversely, regularity is likely to be found in the localized SC-FDMA scheme. On the other hand, an error correction code has a feature of being robust to random errors and being difficult to produce the effect of error correction for burst error.

However, in the localized SC-FDMA scheme, as described above, the correlation of channel fluctuations is high between neighboring subcarriers, and, consequently, subcarriers of low received quality occur in a consecutive manner. Therefore, by exercising ingenuity to prevent these subcarriers of low received quality that occur in a consecutive manner from coming in a burst manner as much as possible, the effect of error correction is easier to be produced.

As shown in FIG. 14B, if data D#1, D#2, D#3, D#4, D#5, D#6, D#7 and D#8 are allocated to sequential subcarriers and then transmitted, there are conditions where burst error is likely to occur because of the above-described reason, and, consequently, the effect of error correction is difficult to produce.

In view of the above-described consideration, the present embodiment proposes the allocation of data (i.e. symbols) to subcarriers as shown in FIG. 14C.

To perform such allocation, first, as the transmission flow between the base station and terminals in FIG. 2, terminal A transmits reference symbol 101 and request information symbol 102. Here, as an example, terminal A will be focused and explained.

Channel state estimating section 212 of the base station in FIG. 12 estimates the channel state and outputs the estimation result as channel state information 213. Based on channel state information 213, frequency allocation determining and control information generating section 214 determines use frequencies to allocate to terminal A as carriers 10 to 17, as shown in, for example, FIGS. 14B and 14C. Further, frequency allocation determining and control information generating section 214 estimates the order of received quality of carriers 10 to 17, based on channel state information 213. This information is transmitted to terminal A as control information 105 in FIG. 2.

That is, as shown in code 1302 in FIG. 14B, when numbers are assigned in ascending order from higher subcarrier to lower subcarriers as to received quality, the resulting order is carrier 13, carrier 12, carrier 17, carrier 11, carrier 10, carrier 14, carrier 16 and carrier 15, and therefore the base station transmits information about this order of received quality as control information 105 in FIG. 2.

Here, in the present embodiment, the number of carriers (or subcarriers) to use is small in SC-FDMA, so that it is possible to perform a arrangement in ascending order in an easy manner. If the number of carriers increases, it is difficult to perform an arrangement in ascending order, while it is relatively easier to provide the random characteristics by interleaving in interleaver 1204A.

In view of the above, the method according to the present embodiment is not limited to the localized SC-TDMA scheme, but is applicable to a wide range of cases where a multicarrier scheme such as OFDM is used and the number of carriers to use is small. For example, even when the method according to the present embodiment is applied to a case where a base station transmits signals to terminals using OFDMA and where the number of carriers to allocate to each terminal is small, it is possible to produce the same influence as described above.

Further, although a base station arranges the received quality of subcarriers in ascending order in the present embodiment, it may also be used that the base station transmits information about channel fluctuations to a terminal and the terminal arranges the received quality of subcarriers in ascending order based on this information. Here, a terminal changes the transmission method based on information about subcarriers arranged in order from higher received quality. On the other hand, if a base station does not know the information about subcarriers arranged in order from higher received quality, it is difficult for the base station to demodulate signals from the terminal. This will be explained below.

If the terminal performs a arrangement in ascending order, the base station also needs to perform a rearrangement order in ascending order. Taking into account this point, to simplify the configuration of the whole system, a base station should arrange subcarriers in order from higher received quality.

Although an example case has been described where received quality are arranged in ascending order, "ascending order" is not an essential requirement, and the essential requirement is to arrange the received quality of carriers based on the relative relationships between carriers as to received quality.

FIG. 14C illustrates an example where transmission data are allocated to a plurality of carriers based on received quality of these subcarriers such that these transmission data are not erroneous burstly. In FIG. 14C, when received qualities are arranged in ascending order, carriers with the lowest received quality (i.e. carriers 15 and 16 in the figure) are arranged to far positions upon decoding. FIG. 14C illustrates a case where subcarrier allocating section 306A arranges subcarriers as shown in the code 1303 and allocates data D#1, D#2, D#3, D#4, D#5, D#6, D#7 and D#8 to the arranged subcarriers. By performing such a arrangement, it is possible to prevent subcarriers with low received quality to arrange in a burst manner (i.e. consecutively) upon decoding, so that it is possible to acquire received data of good error rate performance by error correction effect. By the way, it is not possible to arrange data so as to make received quality random, and, consequently, these received quality results in a ruled order.

Although an example case has been described with the above explanation where interleaving processing is not performed for data and the modulation scheme is BPSK, the present invention is not limited to this. For example, in a case where interleaving is performed in interleaver 1204A in FIG. 13, when the numbers are assigned in ascending order from higher subcarrier to lower subcarriers as to received quality, an interleaving pattern in interleaver 1204A may be set to one optimal pattern. In this case, if subcarrier allocating section 306A in FIG. 13 arranges carriers in ascending order based on received quality information per subcarrier and allocates interleaved data to the subcarriers, it is possible to implement the present invention in the same way as in a case where interleaving processing is not performed and it is possible to improve received quality in the same way as in a case where interleaving processing is not performed.

Further, changing the interleaver based on the order of received quality of carriers is another possible method of implementation. However, in this case, a plurality of interleavers need to be provided, and, consequently, there is a high possibility of causing a disadvantage in the computational complexity. However, it is possible to produce the same influence as in the above-described method.

As described above, according to the present embodiment, by changing carriers where transmission data are allocated based on received quality of these carriers, in a wireless communication method of the localized SC-FDMA scheme, the error correction effect improves on the receiving side (i.e. on the base station side), so that it is possible to provide received data of good error rate performance.

Although a case has been described above with the present embodiment where the present invention is mainly applied to the localized SC-FDMS scheme, the present invention is not limited to this, but is also applicable to the distributed SC-FDMA scheme and produce the same influence. Further, as described above, the applicable range of the transmission method according to the present embodiment is not limited to the SC-FDMA scheme, and it is possible to apply the method to a wide range of case of performing transmission in a multicarrier scheme such as OFDM.

Here, the important thing is that the method according to the present embodiment proves especially effective when the method is applied to a system in which the number of subcarriers to use is small. Further, in the case of OFDMA, the transmission method proves effective especially when the method is applied to a case where the number of carriers to allocate to each user is small.

Further, although a case has been described above with the present embodiment where one modulation signal (stream) is transmitted for ease of explanation, the present invention is naturally applicable to transmission scheme using MIMO scheme. In this case, SNR in separated signals, SINR in separated signals or an amplitude of eigenvalue may be used as a parameter corresponding to received quality.

Embodiment 5

With the present embodiment, a case will be explained in detail, where the method of changing the rule of frequency allocation between terminals in the distributed SC-FDMA scheme, which was explained in Embodiment 2, is applied to a system in which a base station performs reception using sector antennas.

Figure 15:
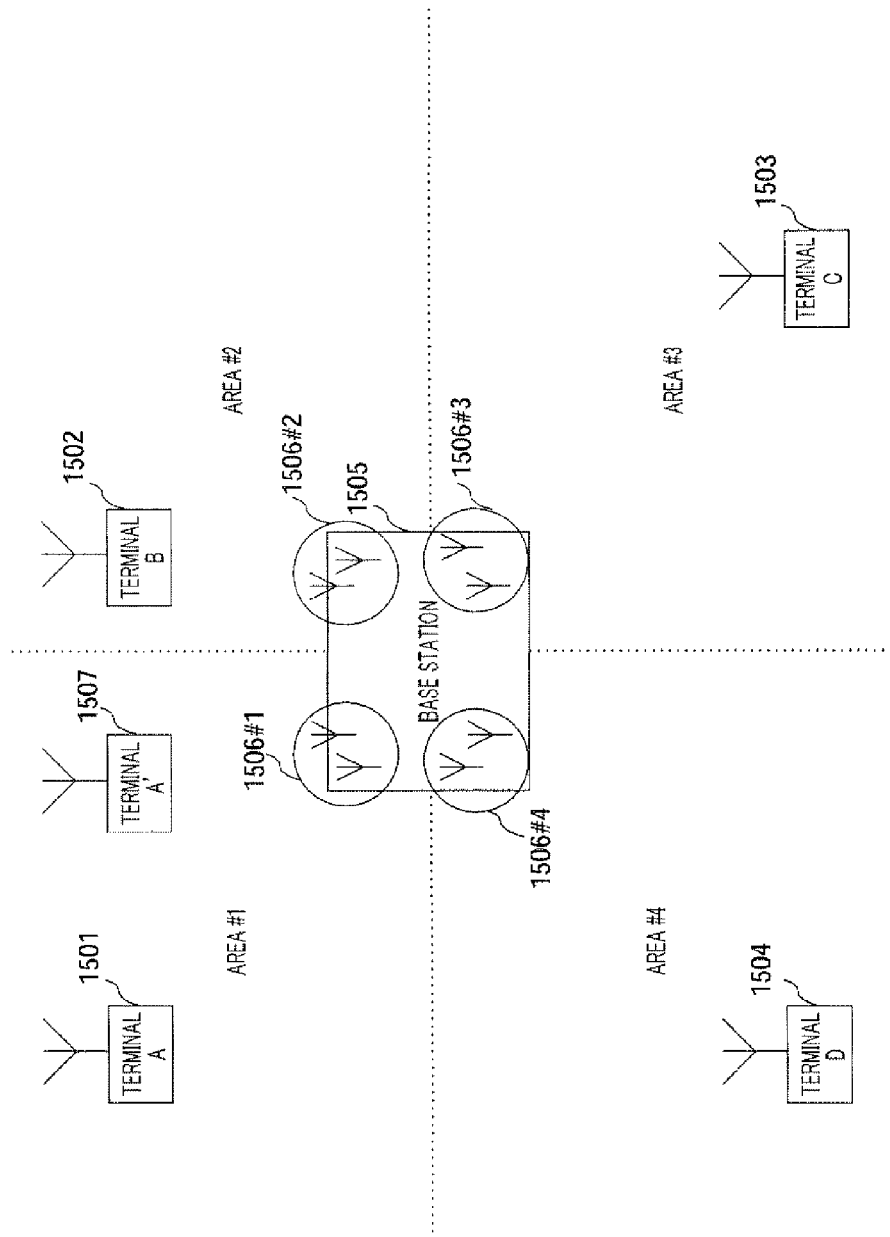
FIG. 15 illustrates an example of positional relationships between a base station and terminals, and allocation of sector antennas in the base station.

FIG. 15 illustrates an example of the positional relationships between a base station and terminals, and the positions of sector antennas of the base station. Terminal A (1501) and terminal A' (1507) exist in area #1. Terminal B (1502) exists in area #2, terminal C (1503) exists in area #3, and terminal D (1504) exists in area #4.

Base station 1505 has antennas 1506 #1 to 1506 #4. Antenna 1506 #1 is used to communicate with the terminals that exist in area #1. Similarly, antenna 1506 #2 is used to communicate with the terminal that exists in area #2, antenna 1506 #3 is used to communicate with the terminal that exists in area #3, and antenna 1506 #4 is used to communicate with the terminal that exists in area #4.

Figure 16:
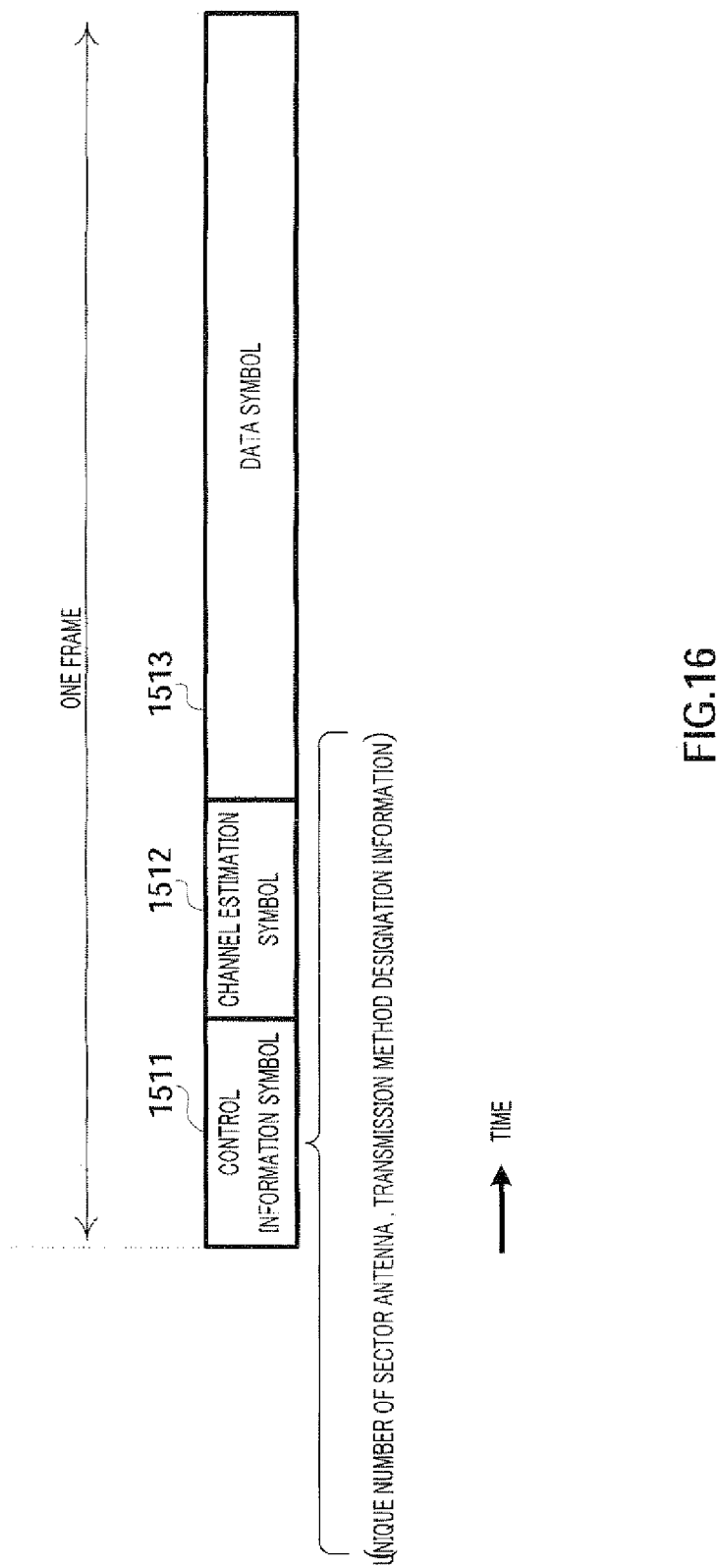
FIG. 16 illustrates a frame configuration example of a modulation signal that is transmitted in a base station in the time domain.

FIG. 16 illustrates an example of the frame configuration of a modulation signal in the time domain that is transmitted in the base station. Control information symbol 1511 is a symbol for transmitting control information to a terminal. Here, for example, the control information is information such as the modulation scheme and error correction scheme of the modulation signal that is transmitted in the base station. The present embodiment is designed to make control information symbol 1511 include, for example, a unique number of the sector antenna used to transmit a modulation signal in the base station, and information designating the transmission method of a modulation signal that is transmitted in the terminal, to allow a terminal to determine the modulation scheme of a signal that is transmitted in a terminal.

Channel estimation symbol 1512 is a symbol used for the terminal to estimate fluctuation in propagation of a modulation signal that is transmitted in the base station. Data symbol 1513 is a symbol used for the base station to transmit data that is transmitted to the terminal.

Figure 17:
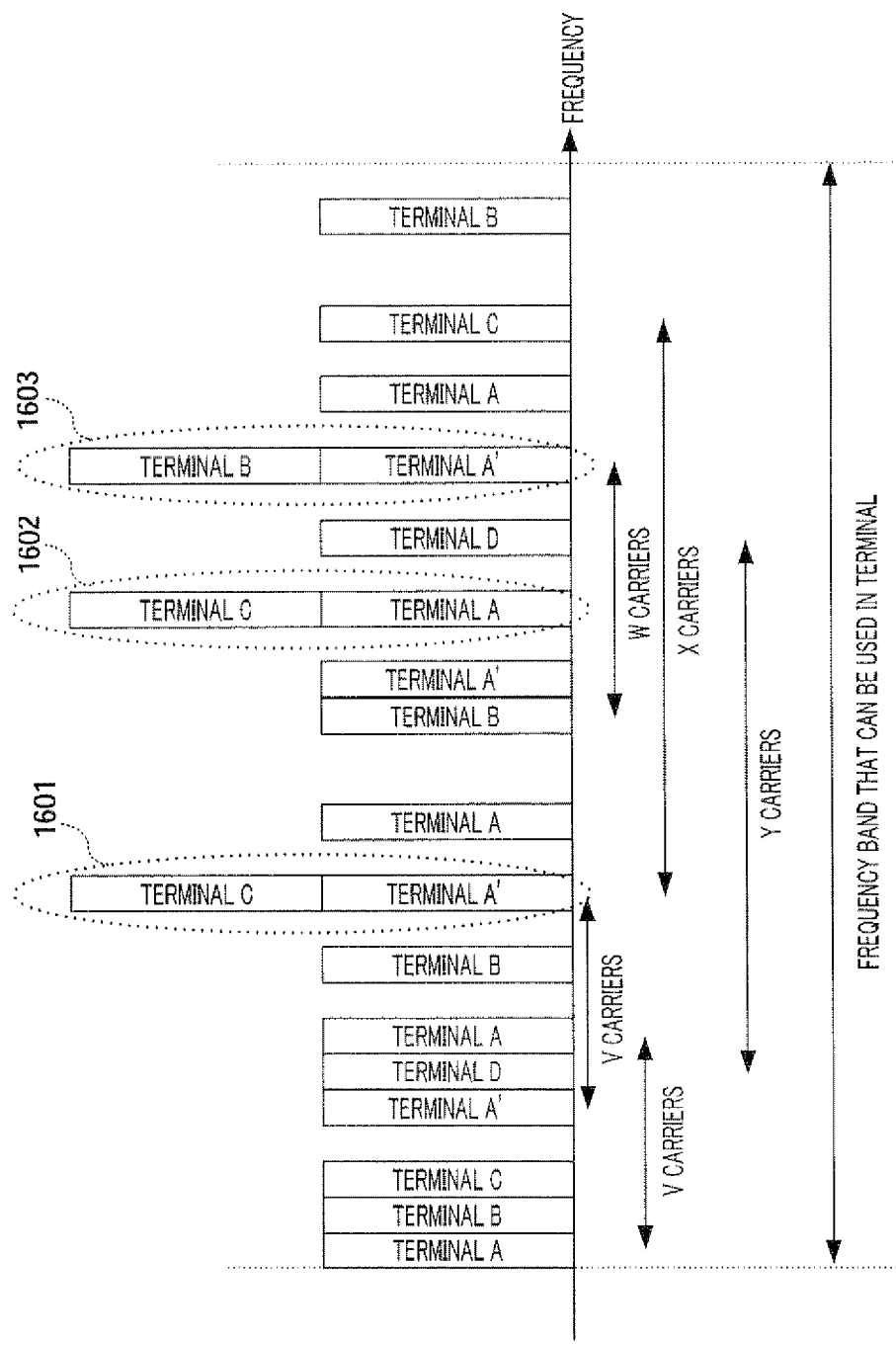
FIG. 17 illustrates an example of frequency allocation in terminals according to Embodiment 5.

FIG. 17 illustrates an example of frequency allocation to terminals, according to the present embodiment. The frequency allocation according to the present embodiment depends on the relationships between sector antennas and the terminals. This will be explained below in detail.

In FIG. 15, Y carrier intervals are set for frequency allocation to the terminals that exist in area #1 (i.e. the terminals that perform communication using antenna 1506 #1), W carrier intervals are set for frequency allocation to the terminal that exists in area #2 (i.e. the terminal that performs communication using antenna 1506 #2), X carrier intervals are set for frequency allocation to the terminal that exists in area #3 (i.e. the terminal that performs communication using antenna 1506 #3), and Y carrier intervals are set for frequency allocation to the terminal that exists in area #4 (i.e. the terminal that performs communication using antenna 1506 #4).

In this case, like terminal A' (1507) and terminal B (1502) in FIG. 15, if there are terminals positioned near the boundaries of areas, for example, antenna 1506 #2 for area #2 suffers interference from a modulation signal that is transmitted in terminal A' (1507). Further, antenna 1506 #1 for area #1 suffers interference from a modulation signal that is transmitted in terminal B (1502).

To alleviate such interference, in the present embodiment, as shown in FIG. 17, the relationship $V \neq W \neq X \neq Y$ holds such that the carrier intervals all vary. By this means, as explained in Embodiment 2, frequencies are allocated to the terminals in different intervals, so that it is possible to alleviate the interference between transmission signals due to combinations of the terminals. In FIG. 17, carriers in which interference occurs are the carriers designated by the codes 1601, 1602 and 1603. However, taking into account that base station 1505 uses sector antennas, actually, only the carriers designated by the code 1603 suffer serious interference occurs, so that it is possible to improve received quality in the base station. Here, although a case has been described above where the carrier intervals are set to hold the relationship of $V \neq W \neq X \neq Y$, actually, different intervals in adjacent areas are required, and, consequently, the essential requirement is to set the carrier intervals to hold the relationships of V≠W, W≠X, X≠Y and V≠Y. The relationships of V=X and W=Y may be used.

Figure 18:
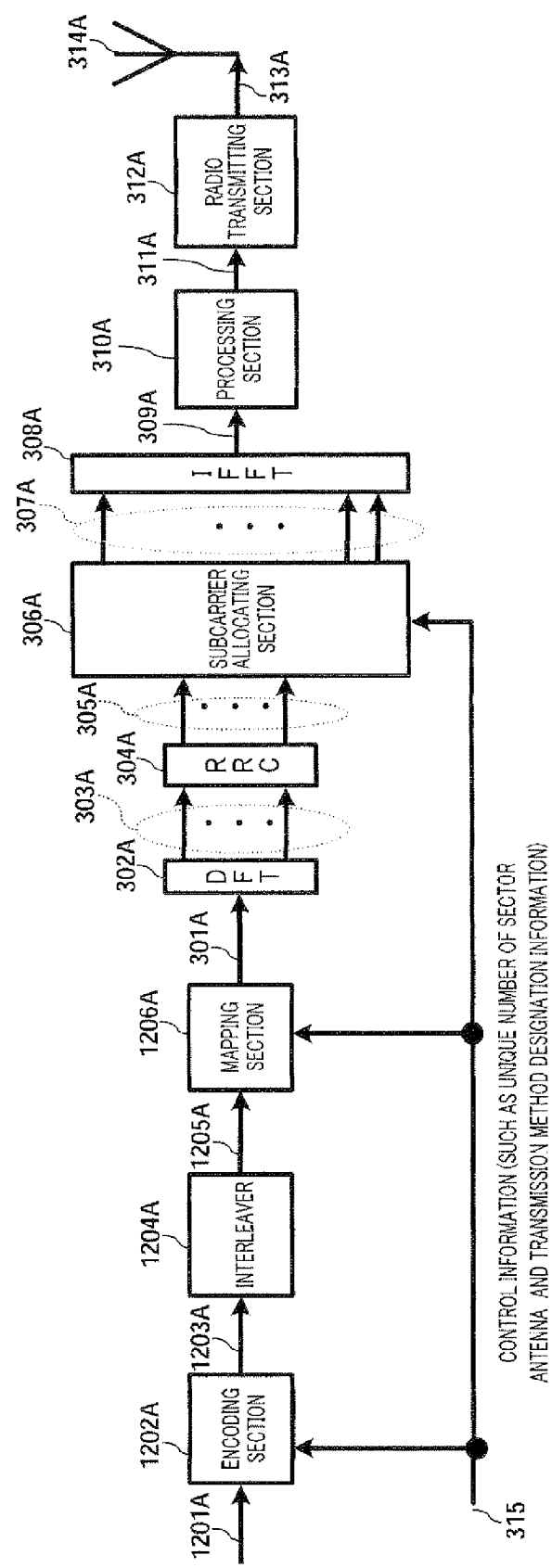
FIG. 18 is a block diagram showing a configuration example of the transmission system in a terminal according to Embodiment 5.

FIG. 18, which is assigned the same reference numerals to the same components as in FIG. 4, illustrates a configuration example of the transmission system of the terminal according to the present embodiment. In the terminal in FIG. 18, control information transmitted from the base station is received as input in coding section 1202A, mapping section 1206A and subcarrier allocating section 306A. Subcarrier allocating section 306A performs frequency allocation (i.e. determines carriers to use) based on control information 315. In this case, subcarrier allocating section 306A allocates frequency at the above-noted carrier intervals, while using the unique number of a sector antenna used to transmit a modulation signal in the base station, and information designating the transmission method for a modulation signal transmitted in the terminal, which are included in control information 315.

As described above, according to the present embodiment, by changing the rule of frequency allocation to terminals in the distributed SC-FDMA scheme according to a sector antenna that is used for communication in a base station, interference between sectors can be suppressed efficiently, so that it is possible to improve received quality of data.

Next, another implementation method different from the above-described implementation method will be explained. Assume that the positional relationships between a base station and terminals are the same as in FIG. 15. Here, terminal A (1501), terminal A' (1507) and terminal B (1502) are noted. To suppress interference in the same way as above, terminal A (1501) and terminal A' (1507) transmit modulation signals using the distributed SC-FDMA scheme, and terminal B (1502) transmits a modulation signal using the localized SC-FDMA scheme.

Figure 19:
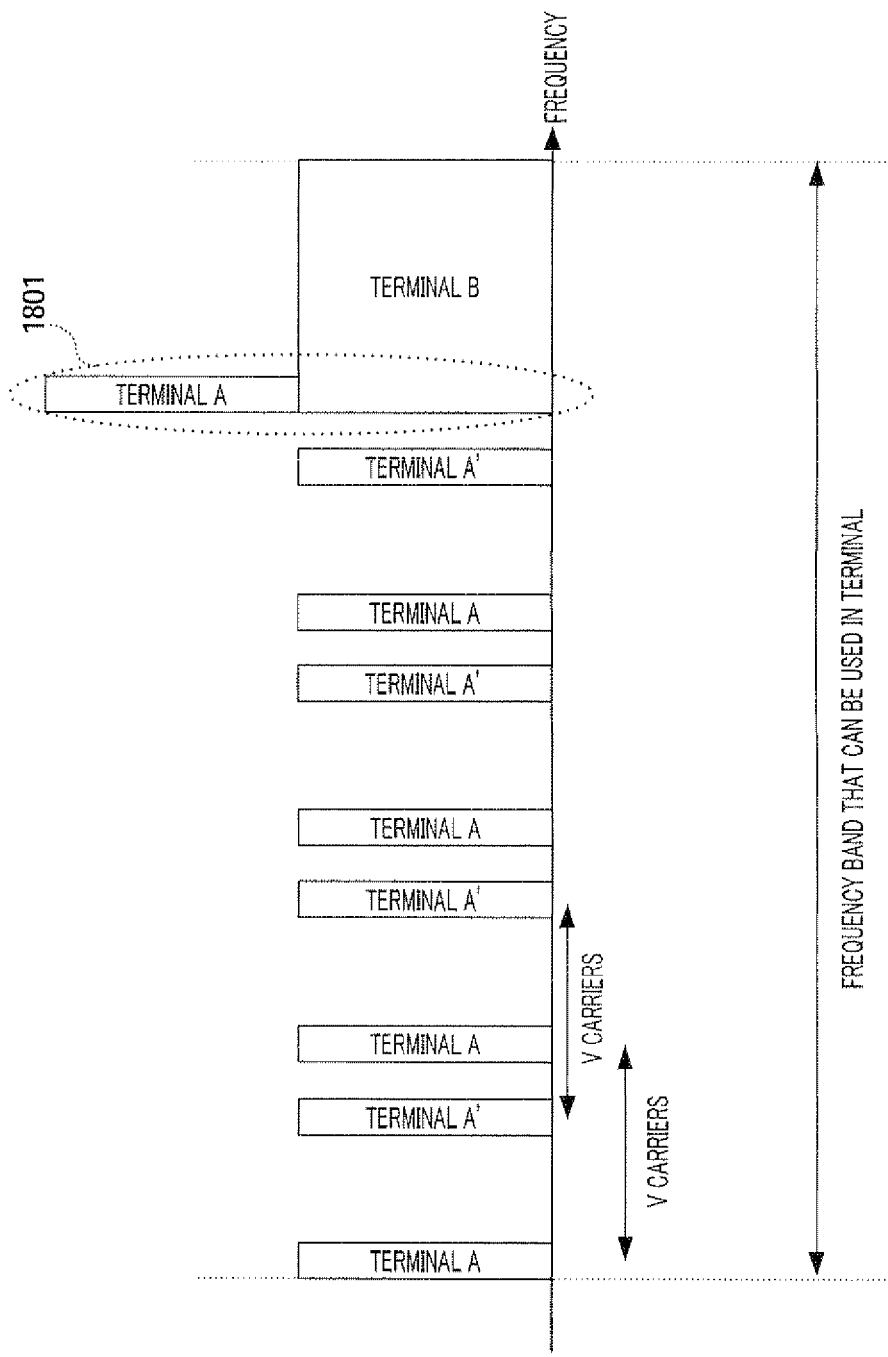
FIG. 19 illustrates another example of frequency allocation according to Embodiment 5.

FIG. 19 illustrates the state of frequency utilization in this case. In FIG. 19, for the terminals that exist in area #1 in FIG. 15, that is, for terminal A (1501) and terminal A' (1507) that perform communication using antenna 1506 #1 of the base station, frequencies are allocated every V carriers (i.e. frequency allocation according to the distributed SC-FDMA scheme is performed). On the other hand, the terminal that exists in area #2 adjacent to area #1, that is, terminal B (1502) that performs communication using antenna 1506 #2 of the base station transmits a modulation signal according to the localized SC-FDMA scheme. By this means, as shown in FIG. 19, the region designated by the code 1801 is the only frequency region to cause interference, so that it is possible to improve received quality in the base station.

As described above, when a base station uses sector antennas, amongst terminals that communicate with adjacent sector antennas, a terminal in one sector transmits a modulation signal of the distributed SC-FDMA scheme and a terminal in the other sector transmits a modulation signal of the localized SC-FDMA scheme, so that it is possible to alleviate interference when the base station receives the modulation signals, thereby improving received quality of data.

Embodiment 6

With the present embodiment, a method utilizing the features of Embodiments 1 and 2 upon retransmission, will be explained in detail.

Figure 20:
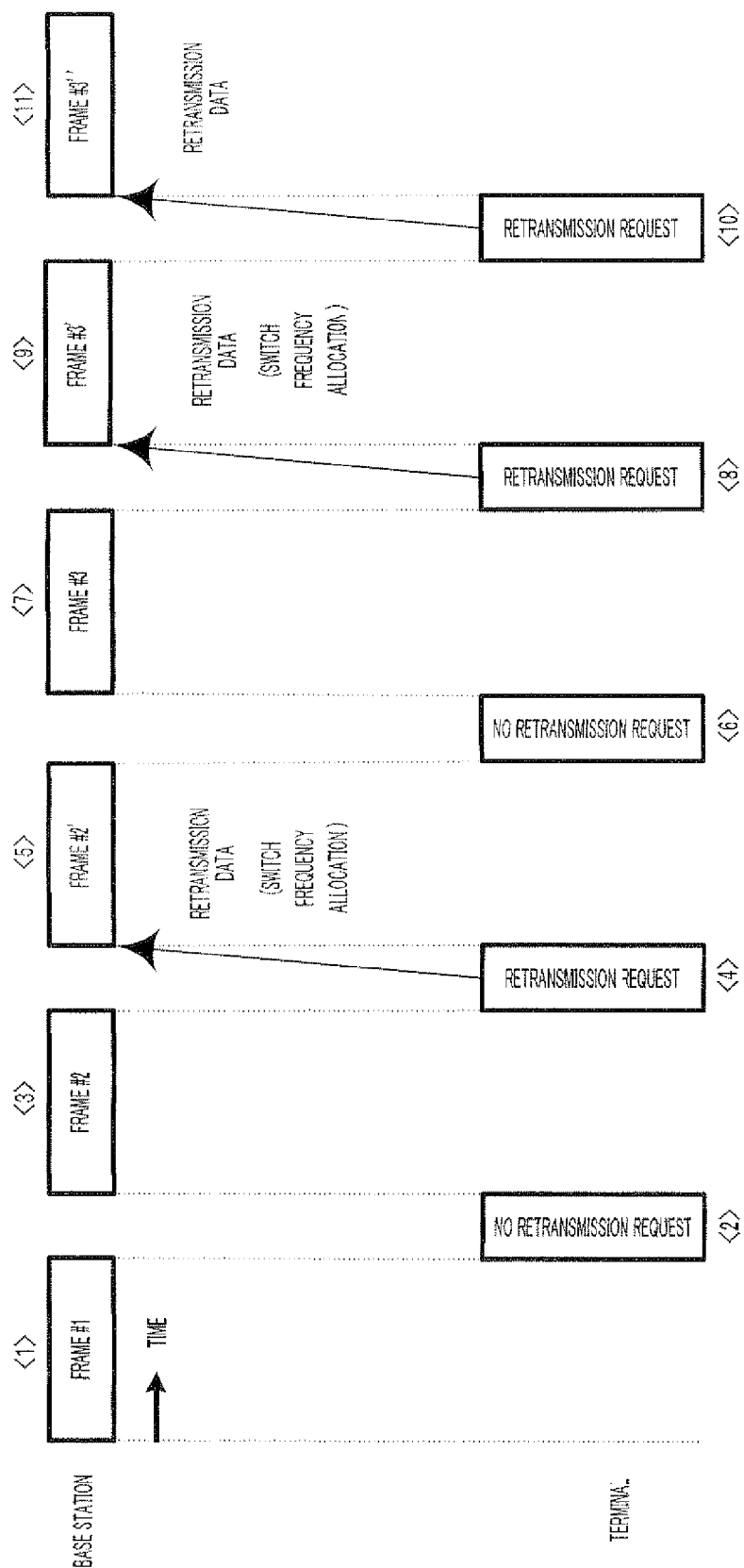
FIG. 20 illustrates an example of the flow of frames that are transmitted in a base station and terminal according to Embodiment 6.

FIG. 20 illustrates an example of the flow of frames that are transmitted in a base station and terminal, according to the present embodiment.

FIG. 20<1>:
First, the base station transmits the modulation signal of frame #1. In this case, assume that the data for transmission is not retransmission data.

FIG. 20<2>:
The terminal, having received, demodulated and decoded the signal of frame #1, does not send a retransmission request to the base station since no error is found as a result of frame error check.

FIG. 20<3>:
The base station transmits the modulation signal of frame #2.

FIG. 20<4>
The terminal, having received, demodulated and decoded the signal of frame #2, sends a retransmission request to the base station since error is found as a result of frame error check.

FIG. 20<5>
The base station, upon receiving the retransmission request from the terminal, transmits frame #2' corresponding to the data transmitted in frame #2. The retransmission method will be explained below in detail.

FIG. 20<6>
The terminal, having received, demodulated and decoded the signal of frame #2', does not send a retransmission request to the base station since no error is found as a result of frame error cheek.

FIG. 20<7>:
The base station transmits the modulation signal of frame #3.

FIG. 20<8>:
The terminal, having received, demodulated and decoded the signal of frame #3, sends a retransmission request to the base station since error is found as a result of frame error check.

FIG. 20<9>:
The base station, upon receiving the retransmission request from the terminal, transmits frame #3' corresponding to the data transmitted in frame #3. The method of retransmission will be explained below in detail.

FIG. 20<10>:
The terminal, having received, demodulated and decoded the signal of frame #3', sends a retransmission request to the base station since error is found as a result of frame error check.

FIG. 20<11>
The base station, upon receiving the retransmission request from the terminal, transmits frame #3" corresponding to the data transmitted in frame #3. The method of retransmission will be explained below in detail.

Figure 21:
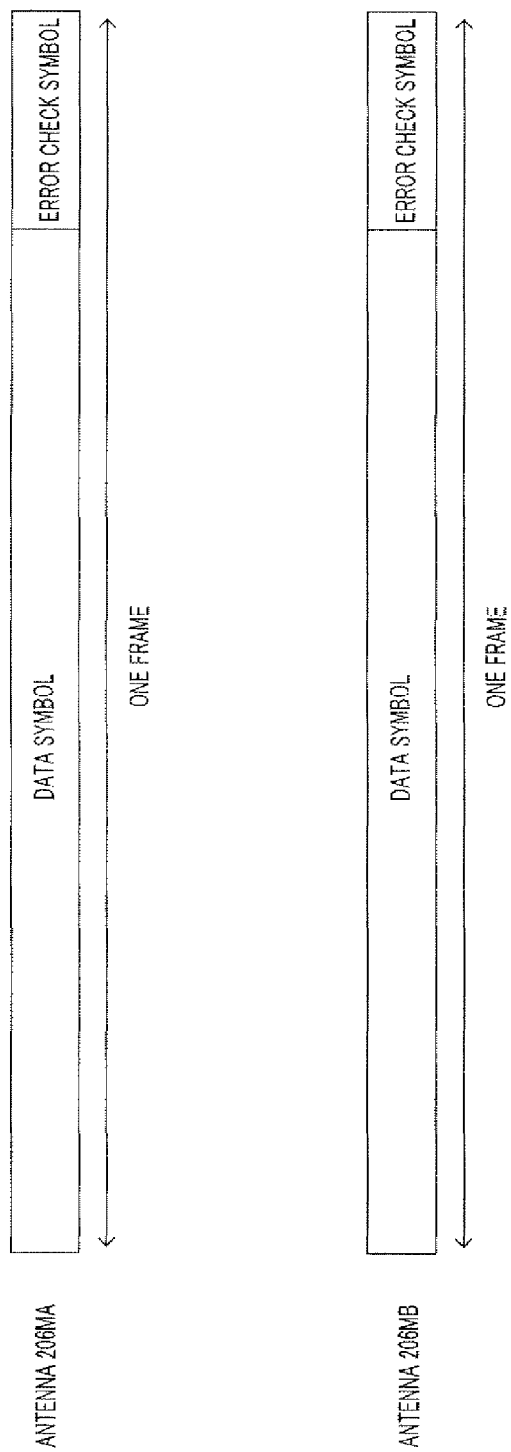
FIGS. 21A and 21B illustrate frame configuration examples of modulation signals that are transmitted from antennas.

FIG. 21 illustrates a configuration example of one frame of a modulation signal that is transmitted in a terminal, according to the present embodiment. A modulation signal that is transmitted from antenna 206MA in FIG. 4 is formed with a data symbol and error check symbol (such as CRC (cyclic redundancy check)). Similarly, a modulation signal that is transmitted from antenna 206MB in FIG. 4 is formed with a data symbol and error check symbol.

Figure 22:
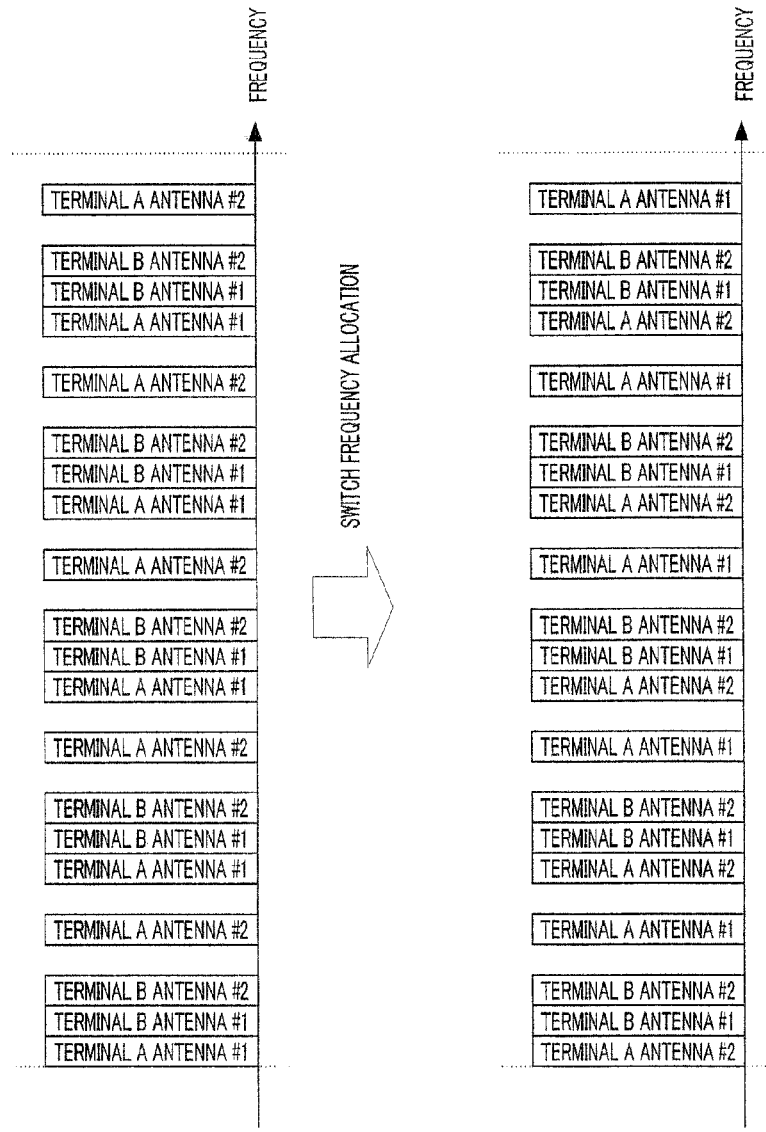
FIG. 22 illustrates an example of frequency allocation in terminals according to Embodiment 6.

FIG. 22 illustrates an example of frequency allocation to terminals according to the present embodiment (where the distributed SC-FDMA scheme is used as an example). In FIG. 22, terminal A corresponds to the terminal illustrated in FIG. 20. In FIG. 22, frequencies are allocated to terminal B too. The frequency described by "terminal A antenna #1" refers to the frequency allocated to a modulation signal that is transmitted from antenna 206MA of terminal A in FIG. 4. The frequency described by "terminal A antenna #2" refers to the frequency allocated to a modulation signal that is transmitted from antenna 206MB of terminal A in FIG. 4.

FIG. 22A illustrates the frequency allocation upon transmission of data that is not retransmission data. That is, FIG. 22A illustrates the frequency allocation upon transmission of frame #1 of FIG. 20<11>, frame #2 of FIG. 20<3> and frame #3 of FIG. 20<7>. FIG. 22B illustrates the frequency allocation upon transmission of retransmission data. That is, FIG. 22B illustrates the frequency allocation upon transmission of frame #2' of FIG. 20<5> and frame #3 of FIG. 20<9>. There are the following two conditions for the transmission method according to the present embodiment.

[1-1]

The frequencies that are used in antenna #1 and antenna #2 of terminal A are used in both cases where data that is not retransmission data is transmitted and where retransmission data is transmitted.

[2-1]

The frequency allocation in antenna #1 of terminal A upon transmission of data that is not retransmission data, and frequency allocation in antenna #1 of terminal A upon transmission of retransmission data, are different. Further, the frequency allocation in antenna #2 of terminal A upon transmission of data that is not retransmission data, and frequency allocation in antenna #2 of terminal A upon transmission of retransmission data, are different.

In the example of FIG. 22, the first frequency group is allocated to antenna #1 of terminal A to transmit data that is not retransmission data (see FIG. 22A), and, upon retransmission, the first frequency group is allocated to antenna #2 of terminal A to transmit retransmission data (see FIG. 22B). Further, the second frequency group is allocated to antenna #2 of terminal A to transmit data that is not retransmission data (see FIG. 22A), and, upon retransmission, the second frequency group is allocated to antenna #1 of terminal A to transmit retransmission data (see FIG. 22B). Switching frequency allocation in such a way upon retransmission provides the following advantages.

Upon retransmission, frequencies are changed, so that it is possible to provide frequency diversity gain and improve received quality.

The transmission method with the frequency change is closed in terminal A that performs retransmission, so that frequency allocation to the other terminal (i.e. terminal B in FIG. 22) is not influenced. By this means, the base station needs not exchange information about frequency allocation with the terminals, so that the efficiency of data transmission improves.

To generate retransmission data, examples of the following methods are usable.

Chase Combining Method:

If this method is used, data that is transmitted for the first time and data that is transmitted upon retransmission, are the same data.

Hybrid ARQ:

With this method, an encoded data sequence is the original sequence, and redundant data (i.e. punctured data) that occurs upon error correction coding is a parity sequence. Then, first, the original sequence is transmitted for the first time, and, if a retransmission request is sent from the communicating party, the parity sequence is transmitted as retransmission data. For example, Non-Patent Document 2 discloses a method of generating punctured data (i.e. redundant data) of a convolutional code.

Figure 23:
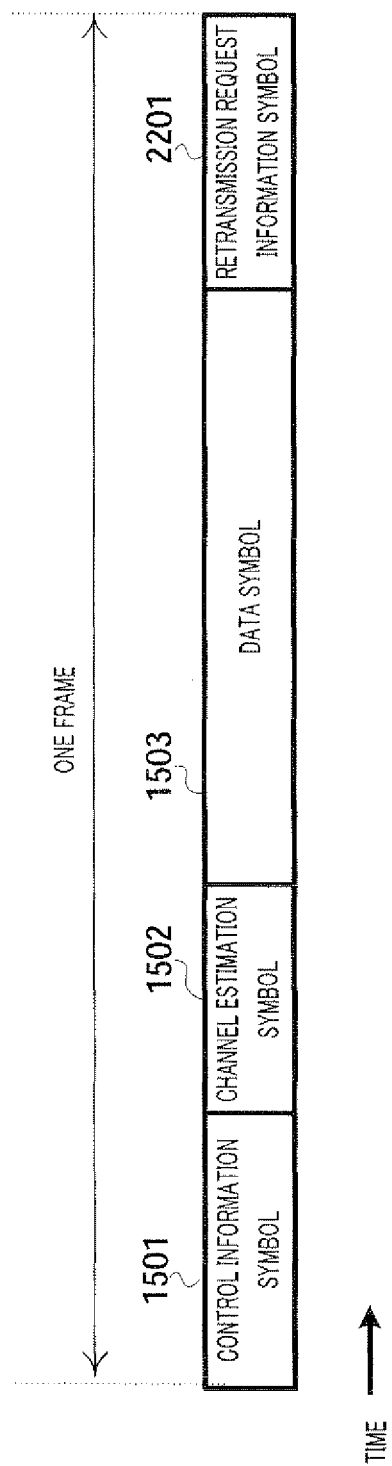
FIG. 23 illustrates a frame configuration example of a modulation signal that is transmitted from a base station to a terminal according to Embodiment 6.

FIG. 23, which is assigned the same reference numerals to the same components as in FIG. 16, illustrates an example of the frame configuration of a modulation signal that is transmitted from a base station to a terminal, according to the present embodiment. Here, retransmission request information symbol 2201 is a symbol for sending a retransmission request to a terminal.

Figure 24:
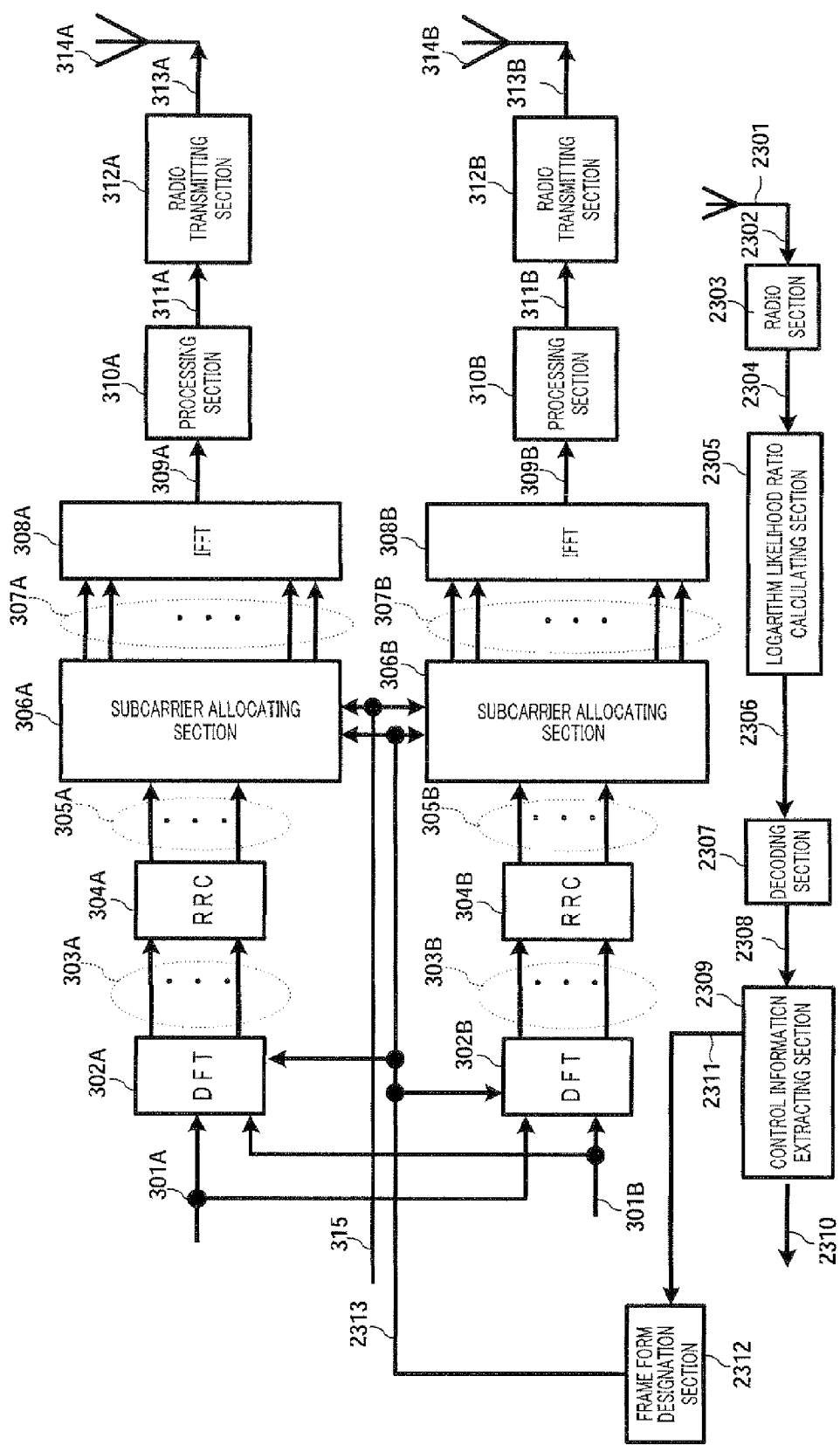
FIG. 24 is a block diagram showing a configuration example of a terminal according to Embodiment 6.

FIG. 24, which is assigned the same reference numerals to the same components as in FIG. 4, illustrates a configuration example of the terminal according to the present embodiment. Although FIG. 4 illustrates only the transmission system, FIG. 24 illustrates the reception system in addition.

Radio section 2303 receives as input received signal 2302, which is received by antenna 2301, acquires baseband signal 2304 by performing processing such as frequency conversion, and outputs baseband signal 2304. Logarithm likelihood ratio calculating section 2305 receives as input baseband signal 2304, and calculates and outputs logarithm likelihood ratio 2306 per bit. Decoding section 2307 receives as input logarithm likelihood ratio 2306 per bit, and acquires and outputs received data 2308 by performing decoding processing.

Control information extracting section 2309 received as input received data 2308, demultiplexer received data 2308 into data 2310 and control information 2311, and outputs these. Frame configuration designation section 2312 receives as input control information 2311, extracts the "retransmission request" information included in control information 2311, and, upon deciding that retransmission is requested, outputs control signal 2313 to designate a change of the frequency allocation.

Subcarrier allocating sections 306A and 306B receive as input control signal 2313, and, when control signal 2313 designates a change of the frequency allocation, changes the frequency allocation. By the way, subcarrier allocating sections 306A and 306B change the frequency allocation under the above-described conditions of [1-1] and [2-1].

Here, in the terminal of FIG. 24, transmission data 301A is received as input in both DFT 302A and 302B, and transmission data 301B is received as input in both DFT 302A and 302B. By this means, the terminal can transmit transmission data 301A and 301B from either antennas 314A or 314B in accordance with the change of the frequency allocation designated by control signal 2313 outputted from frame configuration designation section 2312.

As described above, according to the present embodiment, by changing the frequency allocation upon retransmission under specific rules, it is possible to improve received quality of data without deteriorating transmission efficiency.

Although a case has been described with the above explanation where a terminal transmits a modulation signal using two antennas, the number of antennas is not limited to this, and, if the following conditions [1-2] and [2-2] are satisfied, the present invention is also applicable to cases where a modulation signal is transmitted using two or more antennas.

[1-2]

All frequencies that are used in antennas #1, #2, . . . , #N of terminal A, are used in both cases where data that is not retransmission data is transmitted and where retransmission data is transmitted.

[2-2]

The frequency allocation in antenna #1 of terminal A upon transmission of data that is not retransmission data differs from the frequency allocation in antenna #1 of terminal A upon transmission of retransmission data. Further, the frequency allocation to antenna #2 of terminal A upon transmission of data that is not retransmission data differs from the frequency allocation in antenna #2 of terminal A upon transmission of retransmission data, . . . , and the frequency allocation in antenna #N of terminal A upon transmission of data that is not retransmission data differs from the frequency allocation in antenna #N of terminal A upon transmission of retransmission data.

Next, the method of frequency allocation, which differs from FIG. 22, will be explained in detail using terminal A.

Figure 25:
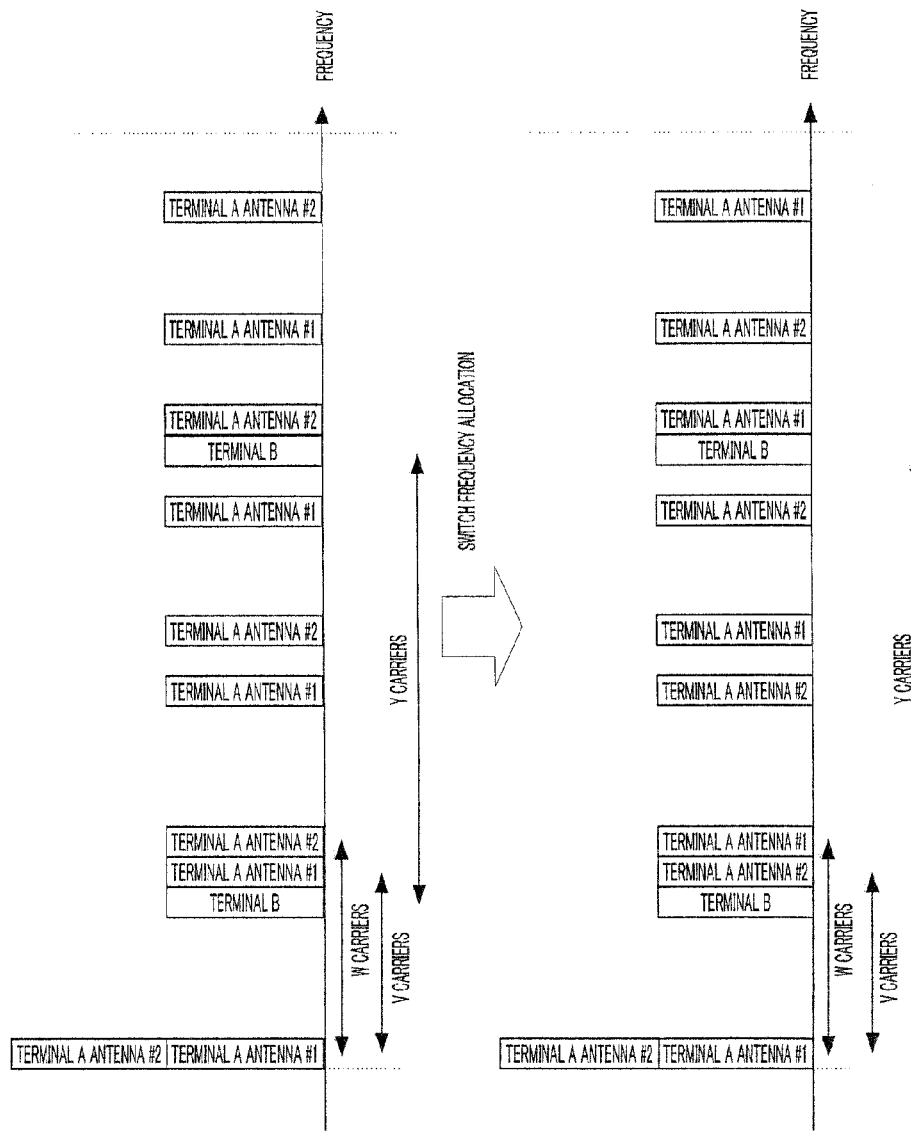
FIG. 25 illustrates an example of frequency allocation in terminals according to Embodiment 6.

FIG. 25 illustrates an example of frequency allocation, which differs from FIG. 22. In FIG. 25, terminal A corresponds to the terminal illustrated in FIG. 20. In FIG. 25, frequencies are allocated even to terminal B in Y carrier intervals. In FIG. 25, the frequency described by "terminal A antenna #1" refers to the frequency allocated to a modulation signal that is transmitted from antenna 206A of terminal A in FIG. 4. Further, the frequency described by "terminal A antenna #2" refers to the frequency allocated to a modulation signal that is transmitted from antenna 206B of terminal A in FIG. 4.

FIG. 25A illustrates the frequency allocation upon transmission of data that is not retransmission data. That is, FIG. 25A illustrates the frequency allocation upon transmission of frame #1 of FIG. 20<1>, frame #2 of FIG. 20<3> and frame #3 of FIG. 20<7>. FIG. 25B illustrates the frequency allocation upon transmission of retransmission data. That is, FIG. 25B illustrates the frequency allocation upon transmission of frame #2' of FIG. 20<5> and frame #3' of FIG. 20<9>.

The frequency allocation method shown in FIG. 25 is similar to the frequency allocation method in FIG. 22, in using the above-described conditions of [1-1] and [2-1]. Further, when the number of antennas is N, the conditions of [1-2] and [2-2] are adopted. On the other hand, the frequency allocation method shown in FIG. 25 differs from the frequency allocation method in FIG. 22, in using different frequency intervals between a modulation signal that is transmitted from antenna #1 of terminal A in the distributed SC-FDMA scheme and a modulation signal that is transmitted from antenna #2 of terminal A in the distributed SC-FDMA scheme. That is, the frequency interval in antenna #1 of terminal A is V carriers, and the frequency interval in antenna #2 of terminal A is W carriers.

In the example of FIG. 25, the first frequency group is allocated to antenna #1 of terminal A to transmit data that is not retransmission data (see FIG. 25A), and, upon retransmission, the first frequency group is allocated to antenna #2 of terminal A to transmit retransmission data (see FIG. 25B). Further, the second frequency group is allocated to antenna #2 of terminal A to transmit data that is not retransmission data (see FIG. 25A) and, upon retransmission, the second frequency group is allocated to antenna #1 of terminal A to transmit retransmission data (see FIG. 25B). That is, it is possible to change the carriers to allocate data before and after retransmission.

Figure 26:
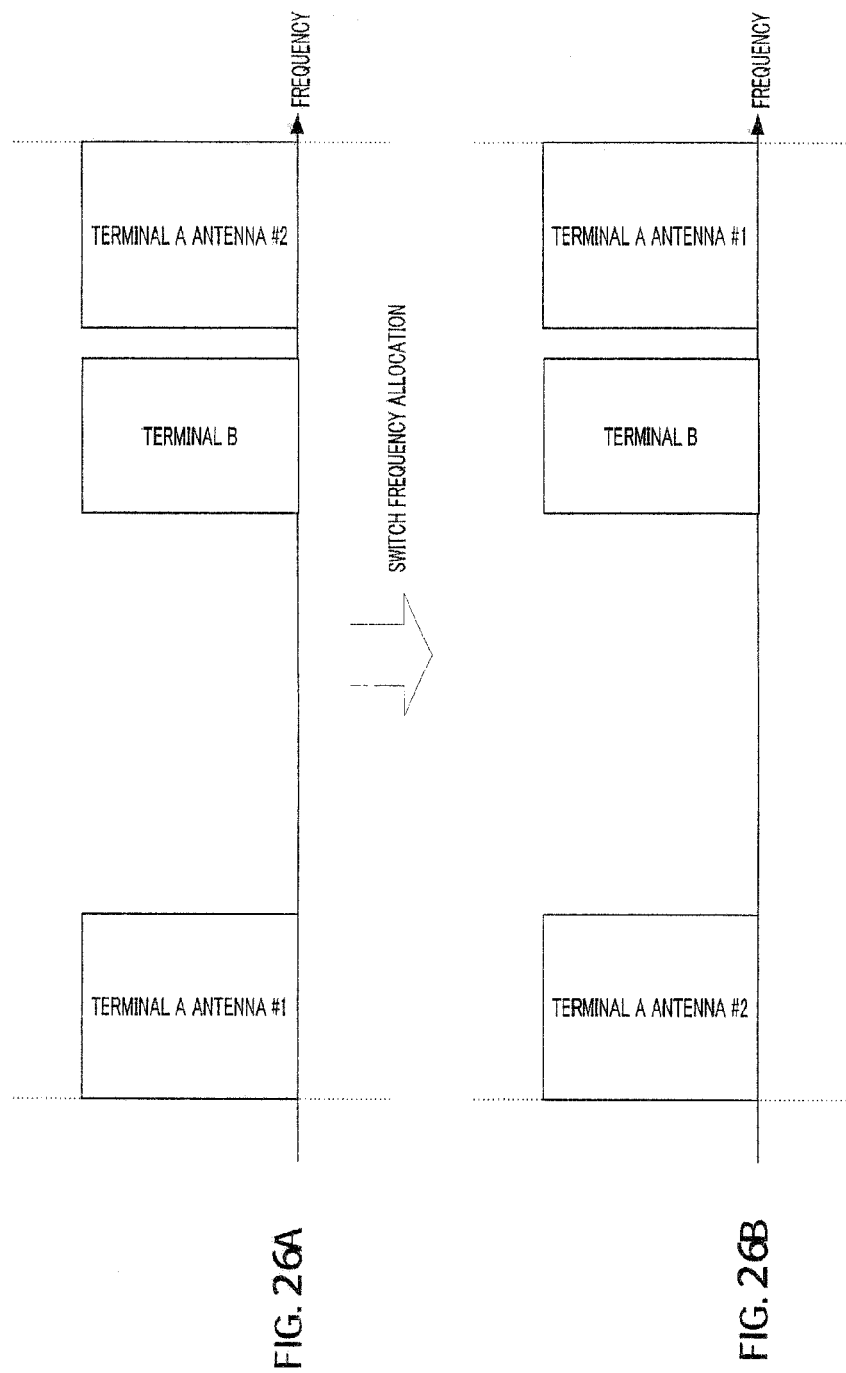
FIG. 26 illustrates an example of frequency allocation in terminals according to Embodiment 6.

FIG. 26 illustrates an example of frequency allocation, which differs from FIGS. 22 and 25. In FIG. 26, terminal A corresponds to the terminal illustrated in FIG. 20. In FIG. 26, frequencies are allocated even to terminal B. The frequency described by "terminal A antenna #1" refers to the frequency allocated to a modulation signal that is transmitted from antenna 206MA of terminal A in FIG. 4. Further, the frequency described by "terminal A antenna #2" refers to the frequency allocated to a modulation signal that is transmitted from antenna 206MB of terminal A in FIG. 4.

FIG. 26A illustrates the frequency allocation upon transmission of data that is not retransmission data. That is, FIG. 26A illustrates the frequency allocation upon transmission of frame #1 of FIG. 20<1>, frame #2 of FIG. 20<3> and frame #3 of FIG. 20<7>. FIG. 26B illustrates the frequency allocation upon transmission of retransmission data. That is, FIG. 26B illustrates the frequency allocation upon transmission of frame #2' of FIG. 20<5> and frame #3' of FIG. 20<9>.

The frequency allocation method shown in FIG. 26 is similar to the frequency allocation method in FIGS. 22 and 25, in using the above-described conditions of [1-1] and [2-1]. On the other hand, the frequency allocation method shown in FIG. 26 differs from the frequency allocation methods in FIGS. 22 and 25, in using the localized SC-FDMA scheme for a modulation signal that is transmitted from antenna #1 of terminal A and for a modulation signal that is transmitted from antenna #2 of terminal A.

In the example of FIG. 26, the first frequency group is allocated to antenna #1 of terminal A to transmit data that is not retransmission data (see FIG. 26A), and, upon retransmission, the first frequency group is allocated to antenna #2 of terminal A to transmit retransmission data (see FIG. 26B). Further, the second frequency group is allocated to antenna #2 of terminal A to transmit data that is not retransmission data (see FIG. 26A), and, upon retransmission, the second frequency group is allocated to antenna #1 of terminal A to transmit retransmission data (see FIG. 26B).

Figure 27:
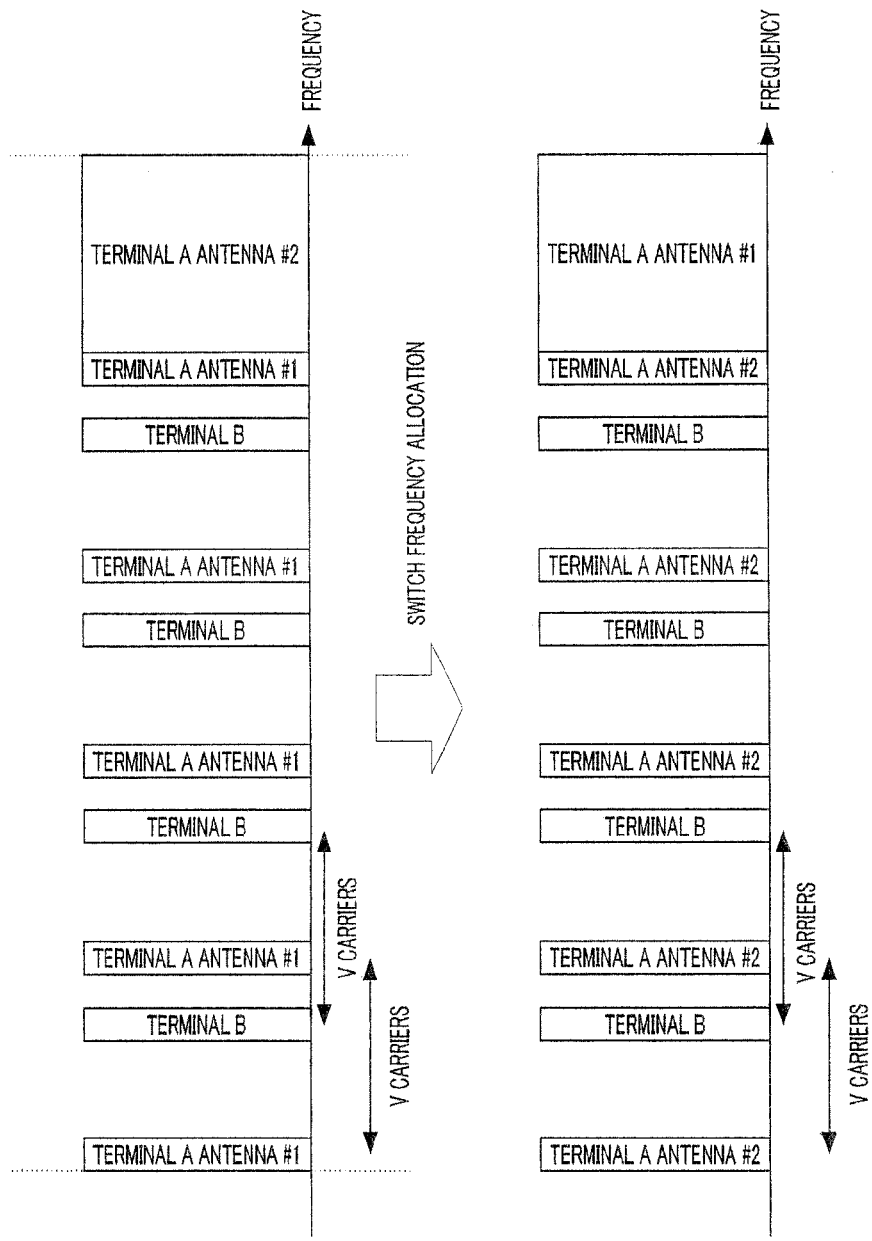
FIG. 27 illustrates an example of frequency allocation in terminals according to Embodiment 6.

FIG. 27 illustrates an example of frequency allocation, which differs from FIGS. 22, 25 and 26. In FIG. 27, terminal A corresponds to the terminal illustrated in FIG. 20. In FIG. 27, frequencies are allocated even to terminal B. In FIG. 27, the frequency described by "terminal A antenna #1" refers to the frequency allocated to a modulation signal that is transmitted from antenna 206MA of terminal A in FIG. 4. Further, the frequency described by "terminal A antenna #2" refer to the frequency allocated to a modulation signal that is transmitted from antenna 206MB of terminal A in FIG. 4.

FIG. 27A illustrates the frequency allocation upon transmission of data that is not retransmission data. That is, FIG. 27A illustrates the frequency allocation upon transmission of frame #1 of FIG. 20<1>, frame #2 of FIG. 20<3> and frame #3 of FIG. 20<7>. FIG. 27B illustrates the frequency allocation upon transmission of retransmission data. That is, FIG. 27B illustrates the frequency allocation upon transmission of frame #2' of FIG. 20<5> and frame #3' of FIG. 20<9>.

The frequency allocation method shown in FIG. 27 is similar to the frequency allocation method in FIGS. 22, 25 and 26, in using the above-described conditions of [1-1] and [2-1]. On the other hand, the frequency allocation method shown in FIG. 27 differs from the frequency allocation method in FIGS. 22, 25 and 26, in using the localized SC-FDMA scheme for one of a modulation signal that is transmitted from antenna #1 of terminal A and a modulation signal that is transmitted from antenna #2 of terminal A, and using the distributed SC-FDMA scheme for the other modulation signal. Further, when the number of antennas is N, the conditions of [1-2] and [2-2] are adopted.

In the example of FIG. 27, the first frequency group is allocated to antenna #1 of terminal A to transmit data that is not retransmission data (see FIG. 27A), and, upon retransmission, the first frequency group is allocated to antenna #2 of terminal A to transmit retransmission data (see FIG. 27B). Further, the second frequency group is allocated to antenna #2 of terminal A to transmit data that is not retransmission data (see FIG. 27A), and, upon retransmission, the second frequency group is allocated to antenna #1 of terminal A to transmit retransmission data (see FIG. 27B). That is, by retransmission in the antennas of terminal A, the localized SC-FDMA scheme and the distributed SC-FDMA scheme switch.

Figure 28:
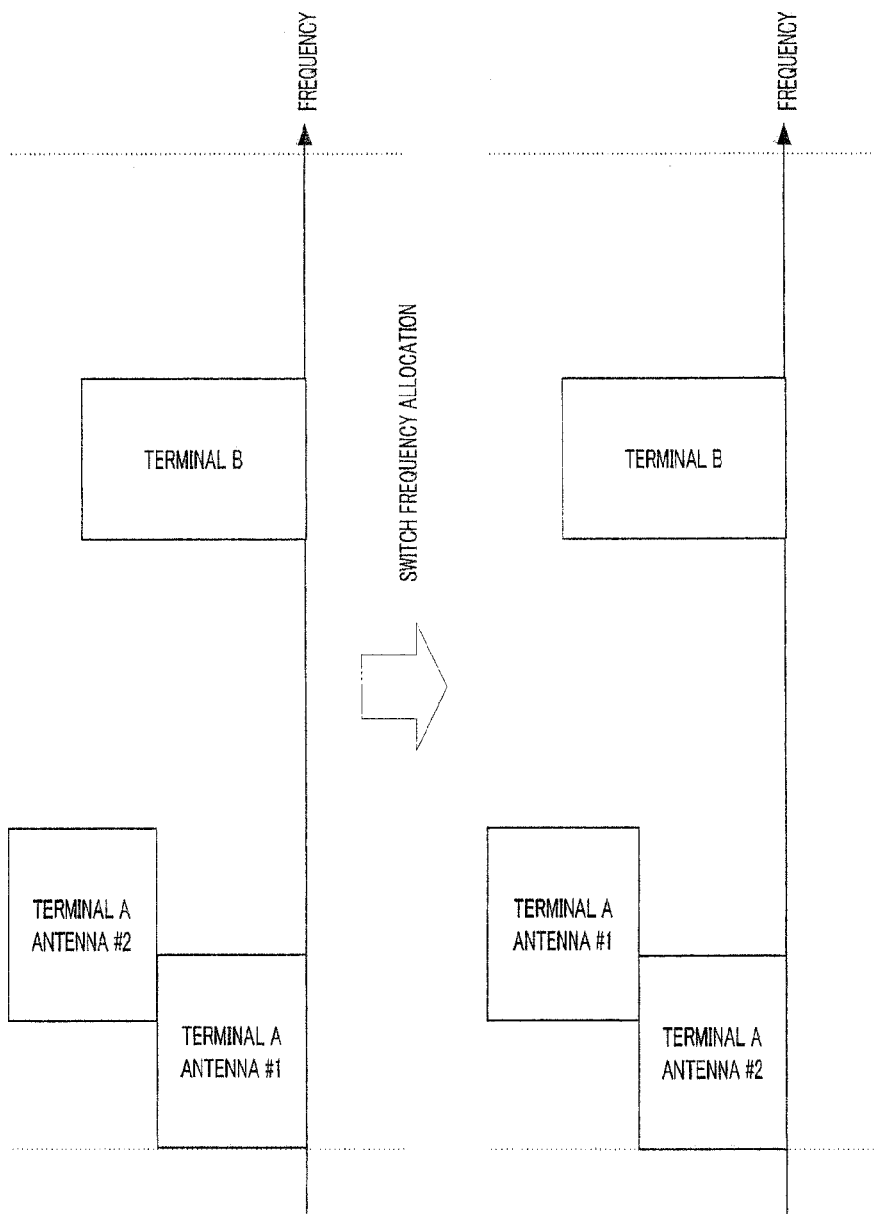
FIG. 28 illustrates an example of frequency allocation in terminals according to Embodiment 6.

FIG. 28 illustrates an example of frequency allocation, which differs from FIGS. 22, 25, 26 and 27. In FIG. 28, terminal A corresponds to the terminal illustrated in FIG. 20.

In FIG. 28, frequencies are allocated even to terminal B. In FIG. 28, the frequency described by "terminal A antenna #1" refers to the frequency allocated to a modulation signal that is transmitted from antenna 206A of terminal A in FIG. 4. Further, the frequency described by "terminal A antenna #2" refers to the frequency allocated to a modulation signal that is transmitted from antenna 206B of terminal A in FIG. 4.

FIG. 28A illustrates the frequency allocation upon transmission of data that is not retransmission data. That is, FIG. 28A illustrates the frequency allocation upon transmission of frame #1 of FIG. 20<1>, frame #2 of FIG. 20<3> and frame #3 of FIG. 20<7>. FIG. 28B illustrates the frequency allocation upon transmission of retransmission data. That is, FIG. 26B illustrates the frequency allocation upon transmission of frame #2' of FIG. 20<5> and frame #3' of FIG. 20<9>.

The frequency allocation method shown in FIG. 28 is similar to the frequency allocation methods in FIGS. 22, 25, 26 and 27, in using the above-described conditions of [1-1] and [2-1]. On the other hand, the frequency allocation method shown in FIG. 28 differs from the frequency allocation methods in FIGS. 22, 25, 26 and 27, in using the localized SC-FDMA scheme for a modulation signal that is transmitted from antenna #1 of terminal A and for a modulation signal that is transmitted from antenna #2 of terminal A and in performing transmission scheme using MIMO scheme in part of the frequencies. Further, when the number of antennas is N, the conditions of [1-2] and [2-2] are adopted.

In the example of FIG. 28, the first frequency group is allocated to antenna #1 of terminal A to transmit data that is not retransmission data (see FIG. 28A), and, upon retransmission, the first frequency group is allocated to antenna #2 of terminal A to transmit retransmission data (see FIG. 28B). Further, the second frequency group is allocated to antenna #2 of terminal A to transmit data that is not retransmission data (see FIG. 28A), and, retransmission, the second frequency group is allocated to antenna #1 of terminal A to transmit retransmission data (see FIG. 28B). That is, by changing the frequency allocation to the antennas of terminal A upon retransmission, the frequencies involved in MIMO transmission and the frequencies not involved in MIMO transmission switch.

As described above, even if the retransmission methods of FIGS. 25, 26, 27 and 28 are used, it is possible to acquire the same influence as in the case of using the retransmission method of FIG. 22.

Although a case has been described above with the present embodiment where terminals use the SC-FDMA scheme, it is equally possible to implement the present invention in the same manner as a case where the terminals use the OFDM scheme and frequencies are allocated to the terminals on a per subcarrier basis. In this case, subcarrier allocation is performed separately between the above-described modulation signal that is transmitted from antennas #1 of terminal A and the above-described modulation signal that is transmitted from antenna #2 of terminal B. A case of using the OFDM scheme differs from a case of using the distributed SC-FDMA scheme or using the localized SC-FDMA scheme, in that it is not necessary to set rules for subcarrier allocation. Even in the case of using the OFDM scheme, if the above-described condition [1-1] and condition [1-2] are satisfied, it is possible to implement the present invention in the same manner as the case of using the SC-FDMA scheme. Further, when the number of antennas is N, the conditions of [1-2] and [2-2] are adopted.

Here, in the case of using the OFDMA scheme, it is not always essential to allocate the first frequency group to antenna #1 of terminal A to transmit data that is not retransmission data, and, upon retransmission, allocate the first frequency group to antenna #2 of terminal A to transmit retransmission data.

Similarly, it is not always essential to allocate the second frequency group to antenna #2 of terminal A to transmit data that is not retransmission data, and, upon retransmission, allocate the second frequency group to antenna #1 of terminal A to transmit retransmission data. However, such allocation may be adopted.

Further, even in the case of using the OFDM scheme, similar to the SC-FDMA scheme, it is possible to implement the present invention even in a case where terminals use two or more antennas. Further, it is equally possible to implement the present invention in the same manner as a case where the OFDM scheme is used for a modulation signal that is transmitted from antenna #1 and the SC-FDMA scheme is used for a modulation signal that is transmitted from antenna #2 (or vice versa).

Other Embodiment (1) Here, an eigenmode will be explained in detail using FIG. 29, amongst transmission schemes using MIMO schemes.

In a system using MIMO scheme, when channel state information is known on the receiving side and further transmitting station side, the transmitting station transmits signals vectorized using transmission channel signature vectors, to the receiving station from transmission array antennas.

Further, using reception channel signature vectors associated with the transmission channel signature vectors, the receiving station can realize a communication method of detecting and demodulating transmission signals from the received signals of the reception array antennas.

Especially, as a communication mode for forming a plurality of channels in communication space and performing multiplex transmission of signals, there is "eigenmode" utilizing a singular vector or an eigenmode vector of a channel matrix. This eigenmode is a method of utilizing the singular vector or eigenmode vector as the above-described channel signature vector. Here, the channel matrix refers to a matrix using, as elements, complex channel coefficients which are acquired by all or part of combinations of the antenna elements of the transmission array antennas and the antenna elements of the reception array antennas.

As a method of acquiring downlink channel state information in a transmitting station, with TDD to utilize the same frequency carriers between uplink and downlink, the transmitting station can estimate or measure channel state information using the uplink from the receiving station (corresponding to terminal B in FIG. 2) and utilizing channel reciprocity. On the other hand, with FDD to utilize different frequency carriers between uplink and downlink, it is possible to can acquire accurate CSI in the downlink in the transmitting station by estimating or measuring channel state information in the downlink in the receiving station.

Eigenmode has a feature of being able to maximize the channel capacity in a system using MIMO scheme, specifically if radio channels in the system using MIMO scheme are processed as a flat fading phase in a narrow band. For example, a wireless communication system adopting OFDM, is generally designed such that a guard interval is inserted to remove intersymbol interference due to multipath delay waves and subcarriers of OFDM are processed as a flat fading phase. Therefore, when OFDM signals are transmitted in the system using MIMO scheme, by using eigenmode, it is possible to spatially multiplex and transmit a plurality of signals in subcarriers.

As opposed to eigenmode which makes channel state information in the downlink known in the transmitting station and receiving station, a number of methods to make channel state information of radio channels known only in the receiving station, are proposed as communication methods utilizing the MIMO scheme. For example, BLAST is known as a method of spatially multiplexing and transmitting signals, which is the same object as eigenmode.

Further, for example, transmission diversity using space-time codes is known as a method to provide spatial diversity effect of antennas by sacrificing the multiplexing level of signals, that is, by not increasing the capacity. Eigenmode is a beam space mode for vectorizing and transmitting signals by transmission array antennas, that is, a beam space mode to map signals in a beam space and then transmit the result. By contrast with this, BLAST and transmission diversity map signals to the antenna elements, and are therefore considered as antenna element mode.

Figure 29:
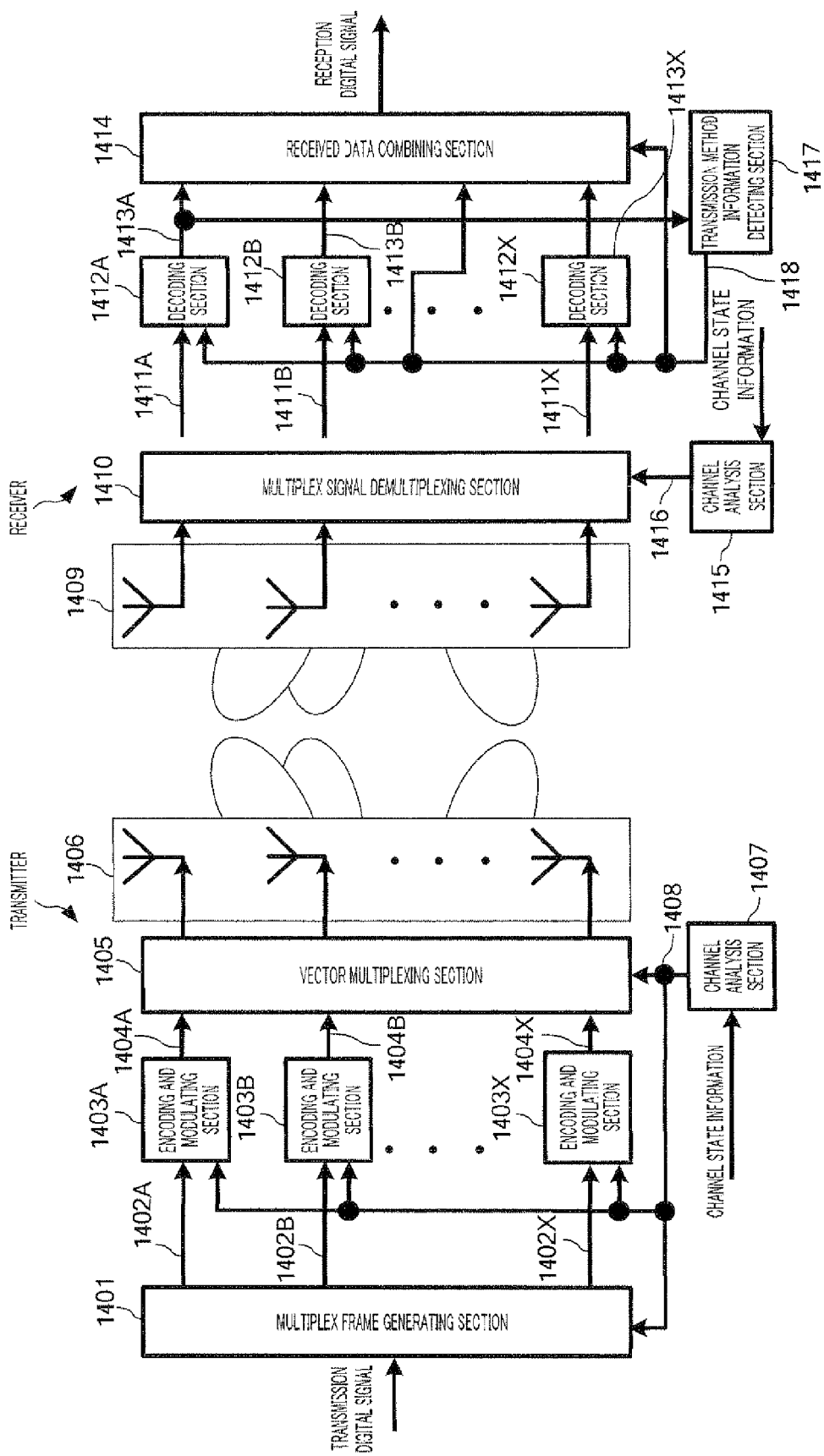
FIG. 29 is a block diagram showing a configuration example of a transceiver that performs eigenmode communication.

FIG. 29 illustrates configuration examples of the transmitter and receiver in eigenmode.

Channel analysis section 1407 of the transmitter calculates a plurality of transmission channel signature vectors to form a multiplex channel based on channel state information showing the result of propagation channel estimation between the transmitter and the receiver, calculates eigenvalues (e.g. λA, λB, λC, . . . , λX) and eigenpaths (e.g. path A, path B, path C . . . , path X) based on SVD (Singular Value Decomposition) of the channel matrix formed by channel state information, and outputs the results as control information.

Multiplex frame generating section 1401 of the transmitter receives as input transmission digital signals and control information 1408, generates a plurality of transmission frames to map to the multiplex channel, and outputs transmission digital signal 1402A of channel A, transmission digital signal 1402B of channel B, . . . , and transmission digital signal 1402X of channel X.

Coding and modulating sections 1403A to 1403X receive as input transmission digital signals 1402A to 1402X and control information 1408, determines coding rates and modulation schemes based on control information 1408, and encodes and modulates transmission digital signals 1402A to 1402X by the determined coding rates and modulation schemes, thereby acquiring and outputting baseband modulation signals 1404A to 1404X of channels A to X.

Vector multiplexing section 1405 receives as input baseband signals 1404A to 1404X of channels A to X, multiples baseband signals 1404A to 1404X of channels A to X by the channel signature vectors individually, combines these multiplication results, and outputs the result to transmission array antennas 1406. Thus, the transmitter transmits signals vectorized using channel signature vectors, from transmission array antennas 1406 to the receiver.

The receiver calculates a plurality of reception channel signature vectors to demultiplex multiplexed transmission signals in channel analysis section 1415 of the receiver based on the channel state information showing the result of propagation channel estimation between the transmitter and the receiver. Multiplex signal demultiplexing section 1410 receives as input received signals, which are received at reception array antenna 1409, and, by multiplying these received signals and channel signature vectors individually, acquires a plurality of received signals, that is, received signals 1411A to 1411X of channels A to X.

Decoding sections 1412A to 1412X receive as input received signals 1411A to 1411X of channels A to X and transmission method information 1418, performs decoding based on transmission method information 1418 (i.e. information about modulation schemes and coding rates), thereby acquiring and outputting digital signals 1413A to 1413X of channels A to X.

Transmission method information detecting section 1417 receives as input digital signal 1413A of channel A, extracts information about the transmission methods of the modulation signals of the channels such as the modulation schemes and coding rates, and outputs the results to decoding sections 1412A to 1412X as transmission method information 1418.

Received data combining section 1414 receives as input digital signals 1413A to 1413X of channels A to X and transmission method information 1418, and acquires received digital signals.

In above-described Embodiments 1 to 4, instead of MIMO scheme using spatial multiplexing, if the MIMO scheme using eigenmode shown in FIG. 29 is applied, it is possible to produce the same influence as described above. That is, which mode of MIMO scheme is used does not influence the above-described embodiments of the present invention, and it is possible to produce the effect of improving the efficiency of frequency use, received quality and transmission speed in any MIMO schemes.

However, to realize eigenmode, information of channel fluctuations need to be shared between communicating parties. Therefore, although the exchange of data between the communicating parties needs to be further added to share the information of channel fluctuations, this is not a factor of disturbing the above-described embodiments.

Further, although the phrases "transmission scheme using MIMO spatial multiplexing" and "eigenmode" are used with the above-described embodiments, these phrases themselves do not influence the scope of the present invention. Further, the word "symbol" itself does not influence the present invention. For example, although the phrases "reference symbol," "control information symbol," "request information symbol" and "pilot symbol" are used, these phrases themselves do not influence the present invention, and it is equally possible to use the words and phrases, for example, "preamble," "midamble," "tail symbol," "known symbol," "control information," "control symbol" and so on.

(2) Although a case has been described above with Embodiment 5 where the distributed FDMA scheme and the localized FDMA scheme are used together upon using sector antennas, an applied example will be described below.

When combining Embodiment 5, Embodiment 1 and Embodiment 2, if a terminal can perform transmission scheme using MIMO spatial multiplexing as shown in FIG. 4, subcarrier allocating sections 306A and 306B perform subcarrier allocation such that, in FIG. 4, a modulation signal that is transmitted from antenna 206MA is a modulation signal of the localized FDMA scheme and a modulation signal that is transmitted from antenna 206MB is a modulation signal of the distributed FDMA scheme. By this means, when the base station receives modulation signals from the terminal, interference can be reduced, so that it is possible to acquire the effect of improving received quality of data.

The disclosure of Japanese Patent Application No. 2007-009649, filed on Jan. 18, 2007, including the specification, drawings and abstract, is incorporated herein by reference in its entirety.

INDUSTRIAL APPLICABILITY

The present invention is applicable and suitable for communication between a base station and a terminal for improving the efficiency of frequency use, using, for example, the SC-FDMA scheme and MIMO scheme technology.

The invention claimed is:

1. A wireless communication method of a distributed single carrier frequency division multiple access scheme for a base station to allocate a plurality of distributed frequency bands to a plurality of terminals, the wireless communication method comprising:

allocating a first plurality of subcarriers of a first distributed frequency band of the plurality of distributed frequency bands to a first terminal of the plurality of terminals in equally-spaced x carrier intervals; and allocating a second plurality of subcarriers of a second distributed frequency band of the plurality of distributed frequency bands to a second terminal of the plurality of terminals in equally-spaced y ($x \neq y$) carrier intervals, wherein each of the first distributed frequency band and the second distributed frequency band is included in one frequency band composed of a plurality of consecutive subcarriers, the first plurality of subcarriers and the second plurality of subcarriers are included in the plurality of consecutive subcarriers, and values of x and y are selected such that a lowest common multiple of x and y is x×y.

2. The wireless communication method according to claim 1, wherein:

the first terminal comprises a plurality of antennas;

the first plurality of subcarriers are allocated to a first antenna of the plurality of antennas; and a third plurality of subcarriers, of the plurality of subcarriers, that are different from the first plurality of subcarriers and the second plurality of subcarriers, are allocated to a second antenna of the plurality of antennas.

3. The wireless communication method according to claim 2, wherein the third plurality of subcarriers are allocated in w carrier intervals, a value of w being different from the values of x and y.

* * * * *